US011421065B2

(12) United States Patent
Masuda et al.

(10) Patent No.: US 11,421,065 B2
(45) Date of Patent: Aug. 23, 2022

(54) ADHESIVE RESIN COMPOSITION AND ADHESIVE SHEET

(71) Applicant: Mitsubishi Chemical Corporation, Chiyoda-ku (JP)

(72) Inventors: Eri Masuda, Tokyo (JP); Junichi Nakamura, Tokyo (JP); Kazuyoshi Odaka, Tokyo (JP); Hiroko Shinada, Tokyo (JP)

(73) Assignee: Mitsubishi Chemical Corporation, Chiyoda-ku (JP)

( * ) Notice: Subject to any disclaimer, the term of this patent is extended or adjusted under 35 U.S.C. 154(b) by 136 days.

(21) Appl. No.: 16/423,929

(22) Filed: May 28, 2019

(65) Prior Publication Data

US 2019/0276717 A1 Sep. 12, 2019

Related U.S. Application Data

(63) Continuation of application No. PCT/JP2017/043280, filed on Dec. 1, 2017.

(30) Foreign Application Priority Data

Dec. 2, 2016 (JP) .............................. JP2016-235030
Dec. 2, 2016 (JP) .............................. JP2016-235336

(51) Int. Cl.
*C08F 265/06* (2006.01)
*C08F 265/04* (2006.01)
*C09J 133/14* (2006.01)
*C09J 133/26* (2006.01)
*C08F 290/04* (2006.01)
*C09J 7/00* (2018.01)
*C09J 133/04* (2006.01)
*C08F 220/18* (2006.01)

(52) U.S. Cl.
CPC ...... *C08F 265/06* (2013.01); *C08F 220/1811* (2020.02); *C08F 265/04* (2013.01); *C08F 290/04* (2013.01); *C09J 7/00* (2013.01); *C09J 133/04* (2013.01); *C09J 133/14* (2013.01); *C09J 133/26* (2013.01)

(58) Field of Classification Search
CPC ...... C09J 133/14; C09J 133/26; C09J 133/04; C09J 7/00; C08F 265/04; C08F 290/04
USPC ........................................................ 428/500
See application file for complete search history.

(56) References Cited

U.S. PATENT DOCUMENTS

| | | | | | |
|---|---|---|---|---|---|
| 4,554,324 A | * | 11/1985 | Husman | ................ | C08F 291/00 525/309 |
| 5,006,582 A | * | 4/1991 | Mancinelli | ........... | C09J 155/005 524/285 |
| 5,057,366 A | * | 10/1991 | Husman | ................ | C08F 290/04 428/510 |
| 5,225,470 A | * | 7/1993 | Mancinelli | ................ | C09J 7/385 524/285 |
| 10,570,237 B2 | * | 2/2020 | Kawai | .................... | C08F 265/06 |
| 2017/0029548 A1 | * | 2/2017 | Kawai | .................... | C08F 265/06 |

FOREIGN PATENT DOCUMENTS

| | | | |
|---|---|---|---|
| CN | 105992779 | A | 10/2016 |
| EP | 0 357 229 | A2 | 3/1990 |
| JP | 59-75975 | | 4/1984 |
| JP | 1-308474 | A | 12/1989 |
| JP | 2-167380 | | 6/1990 |
| JP | 6-336583 | A | 12/1994 |
| JP | 7-173436 | A | 7/1995 |
| JP | 2005-511794 | A | 4/2005 |
| JP | 2016-190906 | | 11/2016 |
| JP | 2016190906 | A * | 11/2016 |
| JP | 2017-95657 | | 6/2017 |
| JP | 2017-95659 | A | 6/2017 |
| KR | 10-2016-0072163 | A | 6/2016 |
| TW | 201529777 | A | 8/2015 |
| WO | WO 2015/080244 | A1 | 6/2015 |

OTHER PUBLICATIONS

Combined Chinese Office Action and Search Report dated Sep. 15, 2020 in corresponding Chinese Patent Application No. 201780073253.3 (with English Translation), 15 pages.
Notification of Reason for Refusal dated Nov. 17, 2020 in Korean Patent Application No. 10-2019-7015118 (with English machine translation), 16 pages.
International Search Report dated Jan. 16, 2018 in PCT/JP2017/043280 filed Dec. 1, 2017 (with English Translation).
Combined Taiwanese Office Action and Search Report dated Mar. 8, 2021 in Patent Application No. 106142116 (with English language translation), 18 pages.
Combined Chinese Office Action and Search Report dated Apr. 23, 2021 in Patent Application No. 201780073253.3 (with English machine translation), 12 pages.
Notice of Reasons for Refusal dated May 18, 2021 in Japanese Patent Application No. 2017-232176 (with English machine translation), 11 pages.
Notice of Reasons for Refusal dated May 18, 2021 in Japanese Patent Application No. 2017-232177 (with English machine translation), 13 pages.

(Continued)

*Primary Examiner* — Michael M. Bernshteyn

(74) *Attorney, Agent, or Firm* — Oblon, McClelland, Maier & Neustadt, L.L.P.

(57) ABSTRACT

Provided are an adhesive resin composition capable of forming an adhesive layer excellent in holding force, wet heat clouding resistance, and low corrosiveness; and an adhesive sheet. The adhesive resin composition includes a (meth)acrylic copolymer (A) having a constituent unit derived from a macromonomer (a) and a constituent unit derived from a vinyl monomer (b), in which the (meth)acrylic copolymer (A) has at least one of an amide bond and a radical polymerizable group.

20 Claims, No Drawings

(56) References Cited

OTHER PUBLICATIONS

Office Action dated Feb. 8, 2022, in Japanese Application No. 2017-232177 (with machine translation obtained by Global Dossier on Mar. 15, 2022).

* cited by examiner

ADHESIVE RESIN COMPOSITION AND ADHESIVE SHEET

This application is a continuation application of International Application No. PCT/JP2017/043280, filed on Dec. 1, 2017, which claims the benefit of priority of the prior Japanese Patent Application No. 2016-235030, filed in Japan on Dec. 2, 2016 and the prior Japanese Patent Application No. 2016-235336, filed in Japan on Dec. 2, 2016, the entire contents of which are incorporated herein by reference.

TECHNICAL FIELD

The present invention relates to an adhesive resin composition and an adhesive sheet.

BACKGROUND ART

A touch panel generally has a structure in which a display device such as a liquid crystal display, a transparent substrate on which a transparent electrode is formed, a transparent protective plate, and the like are laminated. There is a space formed of air layers between these members, and due to a refractive index difference between a material constituting each member and air, diffused reflection of light occurs, and visibility is impaired. In order to eliminate the air layers, the members are laminated via a transparent adhesive layer. For forming the transparent adhesive layer, a transparent double-sided adhesive sheet referred to as optical clear adhesive (OCA) or a liquid transparent adhesive referred to as liquid OCA (LOCA) is used.

As an adhesive resin composition used in OCA and the like, for example, a composition including the following (meth)acrylic copolymer is suggested. In addition, it is suggested that a crosslinking agent and the like are mixed, and crosslinked with the (meth)acrylic copolymer.

A (meth)acrylic copolymer of which mass average molecular weight is from 50,000 to 1,000,000 obtained by polymerizing a monomer mixture product containing a macromonomer of which number average molecular weight is equal to or more than 500 and less than 6,000 and a vinyl monomer (PTL 1).

CITATION LIST

Patent Literature

[PTL 1] PCT International Publication No. WO2015/080244

SUMMARY OF INVENTION

Technical Problem

However, in the (meth)acrylic copolymer disclosed in PTL 1, it is difficult to obtain an adhesive layer excellent in both a property of being hardly clouded when exposed to a high-temperature and high-humidity atmosphere (wet heat clouding resistance) and a property of hardly corroding a transparent electrode and the like in contact with an adhesive layer (low corrosiveness). In addition, holding force of the adhesive layer using the (meth)acrylic copolymer disclosed in PTL 1 was not sufficient, and holding force at a high temperature was particularly not sufficient.

Considering the circumstance, an object of the present invention is to provide an adhesive resin composition capable of forming an adhesive layer excellent in holding force, wet heat clouding resistance, and low corrosiveness; and an adhesive sheet.

Solution to Problem

The present invention has the following embodiments.

[1] An adhesive resin composition including a (meth)acrylic copolymer (A) having a constituent unit derived from a macromonomer (a) having two or more constituent units represented by the following formula (a') and a constituent unit derived from a vinyl monomer (b), in which the (meth)acrylic copolymer (A) has at least one of an amide bond and a radical polymerizable group.

[Chem. 1]

(a')

(In the formula, $R^1$ represents a hydrogen atom, a methyl group, or $CH_2OH$, $R^2$ represents $OR^3$, a halogen atom, $COR^4$, $COOR^5$, CN, $CONR^6R^7$, $NHCOR^8$, or $R^9$, $R^3$ to $R^8$ each independently represent a hydrogen atom, an alkyl group having a non-substituted or substituted group, an alicyclic group having a non-substituted or substituted group, an aryl group having a non-substituted or substituted group, an heteroaryl group having a non-substituted or substituted group, a non-aromatic heterocyclic group having a non-substituted or substituted group, an aralkyl group having a non-substituted or substituted group, an alkaryl group having a non-substituted or substituted group, an organosilyl group having a non-substituted or substituted group, or a (poly)organosiloxane group having a non-substituted or substituted group, each of the substituted group in the groups is at least one selected from the group consisting of an alkyl group, an aryl group, a heteroaryl group, a non-aromatic heterocyclic group, an aralkyl group, an alkaryl group, a carboxylic acid group, a carboxylic acid ester group, an epoxy group, a hydroxy group, an alkoxy group, a primary amino group, a secondary amino group, a tertiary amino group, an isocyanate group, a sulfonic acid group, and a halogen atom, $R^9$ represents an aryl group having a non-substituted or substituted group, a heteroaryl group having a non-substituted or substituted group, or a non-aromatic heterocyclic group having a non-substituted or substituted group, and each of the substituted group in the groups is at least one selected from the group consisting of an alkyl group, an aryl group, a heteroaryl group, a non-aromatic heterocyclic group, an aralkyl group, an alkaryl group, a carboxylic acid group, a carboxylic acid ester group, an epoxy group, a hydroxy group, an alkoxy group, a primary amino group, a secondary amino group, a tertiary amino group, a isocyanate group, a sulfonic acid group, an olefin group having a non-substituted or substituted group, and a halogen atom.)

[2] The adhesive resin composition according to [1], in which the macromonomer (a) is represented by the following formula (1).

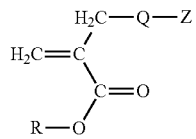

(1)

(In the formula, R represents a hydrogen atom, an alkyl group having a non-substituted or substituted group, an alicyclic group having a non-substituted or substituted group, an aryl group having a non-substituted or substituted group, a heteroaryl group having a non-substituted or substituted group, a non-aromatic heterocyclic group having a non-substituted or substituted group, an aralkyl group having a non-substituted or substituted group, an alkaryl group having a non-substituted or substituted group, an organosilyl group having a non-substituted or substituted group, or a (poly)organosiloxane group having a non-substituted or substituted group, Q represents a main chain portion including two or more constituent units represented by the formula (a'), and Z represents a terminal group.)

[3] The adhesive resin composition according to [1] or [2], in which the (meth)acrylic copolymer (A) includes the amide bond.

[4] The adhesive resin composition according to any one of [1] to [3], in which the (meth)acrylic copolymer (A) includes the radical polymerizable group.

[5] The adhesive resin composition according to [4], in which the radical polymerizable group has an ethylenic unsaturated bond, and an ethylenic unsaturated bond equivalent is 3,000 to 150,000 g/mol.

[6] The adhesive resin composition according to any one of [1] to [5], in which a content of the constituent unit derived from the macromonomer (a) is 3% by mass to 60% by mass with respect to a total mass of all constituent units.

[7] The adhesive resin composition according to any one of [1] to [6], in which an acid value of the copolymer (A) is equal to or less than 3.9 mgKOH/g.

[8] The adhesive resin composition according to any one of [1] to [7], in which a difference between Tg of the macronomer (a) and Tg of a polymer obtained by polymerizing the vinyl monomer (b) is equal to or more than 50° C. [9] The adhesive resin composition according to any one of [1] to [8], in which the vinyl monomer (b) includes an alkyl (meth)acrylate (y1) in which the number of carbon atoms of is equal to or more than 4.

[10] The adhesive resin composition according to any one of [1] to [9], in which a weight average molecular weight of the (meth)acrylic copolymer (A) is from 1,000 to 1,000,000.

[11] An adhesive resin composition including the (meth)acrylic copolymer according to any one of [1] to [10], in which a content of a constituent unit having the amide bond in the constituent unit derived from the vinyl monomer (b) is 0.1% by mass to 30% by mass with respect to a total mass (100% by mass) of the constituent unit derived from the vinyl monomer (b).

[12] The adhesive resin composition according to any one of [1] to [11], in which a number average molecular weight of the macromonomer (a) is from 500 to 100,000.

[13] An adhesive sheet including the adhesive resin composition according to any one of [1] to [12].

Advantageous Effects of Invention

According to the present invention, it is possible to provide an adhesive resin composition capable of forming an adhesive layer excellent in holding force, wet heat clouding resistance, and low corrosiveness, a (meth)acrylic copolymer, and an adhesive sheet.

DESCRIPTION OF EMBODIMENTS

Definitions of the following terms are applied throughout the scope of the present specification and claims.

"Vinyl monomer" means a monomer having an ethylenic unsaturated bond (polymerizable carbon-carbon double bond).

"(Meth)acrylic copolymer" means a copolymer in which at least a part of a constituent unit is a constituent unit derived from a (meth)acrylic monomer. The (meth)acrylic polymer may further include a constituent unit derived from a monomer (for example, styrene and the like) other than the (meth)acrylic monomer.

"(Meth)acrylic monomer" means a monomer having a (meth)acryloyl group.

"(Meth)acryloyl group" is a generic term for an acryloyl group and a methacryloyl group.

"(Meth)acrylate" is a generic term for acrylate and methacrylate. "(Meth)acrylic acid" is a generic term for an acrylic acid and a methacrylic acid. "(Meth)acrylonitrile" is a generic term for acrylonitrile and methacrylonitrile". "(Meth)acrylamide" is a generic term for acrylamide and methacrylamide.

[(Meth)Acrylic Copolymer]

A (meth)acrylic copolymer (hereinafter, referred to as "copolymer (A)") included in an adhesive resin composition of the present invention has a constituent unit derived from a macromonomer (a) having two or more constituent units represented by the formula (a') and a constituent unit derived from a vinyl monomer (b). The copolymer (A) typically has a structure of a graft copolymer or a block copolymer, in which a polymer chain derived from the macromonomer (a) and a polymer chain constituted of a constituent unit derived from the vinyl monomer (b) bind to each other.

A part or all of constituent units that the macromonomer (a) has and a constituent unit derived from the vinyl monomer (h) is a constituent unit derived from a (meth)acrylic monomer.

The constituent unit derived from a (meth)acrylic monomer may be included in any one of the constituent units that the macromonomer (a) has and the constituent unit derived from the vinyl monomer (b), or may be included in both thereof. The constituent unit derived from a (meth)acrylic monomer may be typically included in both thereof.

A content of the constituent unit derived from a (meth) acrylic monomer in the copolymer (A) is preferably 20% by mass to 100% by mass, and more preferably 40% by mass to 100% by mass with respect to a total mass of all the constituent units constituting the copolymer (A).

The adhesive resin composition of the present invention has a constituent unit derived from the macromonomer (a) having two or more constituent units represented by the following formula (a') and a constituent unit derived from the vinyl monomer (b), and includes the (meth)acrylic copolymer (A), in which the (meth)acrylic copolymer (A) has at least one of an amide bond and a radical polymerizable group.

[Chem. 3]

(a′)

(In the formula, $R^1$ represents a hydrogen atom, a methyl group, or $CH_2OH$, $R^2$ represents OR3, a halogen atom, $COR^4$, $COOR^5$, CN, $CONR_6R^7$, $NHCOR^8$, or $R^9$.

$R^3$ to $R^8$ each independently represent a hydrogen atom, an alkyl group having a non-substituted or substituted group, an alicyclic group having a non-substituted or substituted group, an aryl group having a non-substituted or substituted group, a heteroaryl group having a non-substituted or substituted group, a non-aromatic heterocyclic group having a non-substituted or substituted group, a aralkyl group having a non-substituted or substituted group, an alkaryl group having a non-substituted or substituted group, an organosilyl group having a non-substituted or substituted group, or a (poly)organosiloxane group having a non-substituted or substituted group, each of the substituted group in the groups is at least one selected from the group consisting of an alkyl group, an aryl group, a heteroaryl group, a non-aromatic heterocyclic group, an aralkyl group, an alkaryl group, a carboxylic acid group, a carboxylic acid ester group, an epoxy group, a hydroxy group, an alkoxy group, a primary amino group, a secondary amino group, a tertiary amino group, isocyanate group, a sulfonic acid group, and a halogen atom, $R^9$ represents an aryl group having a non-substituted or substituted group, a heteroaryl group having a non-substituted or substituted group, or a non-aromatic heterocyclic group having a non-substituted or substituted group, each of the substituted group in the groups is at least one selected from the group consisting of an alkyl group, an aryl group, a heteroaryl group, a non-aromatic heterocyclic group, an aralkyl group, an alkaryl group, a carboxylic acid group, a carboxylic acid ester group, an epoxy group, a hydroxy group, an alkoxy group, a primary amino group, a secondary amino group, a tertiary amino group, a isocyanate group, a sulfonic acid group, an olefin group having a non-substituted or substituted group, and a halogen atom.

In the copolymer (A), at least a part of the constituent units that the macromonomer (a) has and the constituent unit derived from the vinyl monomer (b) preferably has an amide bond. As the copolymer (A) includes a constituent unit having an amide bond, an adhesive layer excellent in wet heat clouding resistance and low corrosiveness can be formed.

A constituent unit having an amide bond may be included in any one of the constituent units that the macromonomer (a) has and the constituent unit derived from the vinyl monomer (b), or may be included in both thereof.

The constituent unit having an amide bond is a constituent unit derived from an amide bond-containing monomer (hereinafter, referred to as "monomer (x)").

In the copolymer (A), a part of the constituent units that the macromonomer (a) has and the constituent unit derived from the vinyl monomer (b) preferably has an amide bond. That is, not all of the constituent units that the macromonomer (a) has and the constituent unit derived from the vinyl monomer (b) have an amide bond, and the constituent units that the macromonomer (a) has and the constituent unit derived from the vinyl monomer (b) preferably include a constituent unit having an amide bond and a constituent unit not having an amide bond. By including the constituent unit not having an amide bond, functions as an adhesive such as adhesiveness can be expressed.

The constituent unit not having an amide bond may be included in any one of the constituent units that the macromonomer (a) has and the constituent unit derived from the vinyl monomer (b), or may be included in both thereof.

The constituent unit not having an amide bond is typically a constituent unit derived from a monomer other than the monomer (x) (hereinafter, referred to as "monomer (y)").

The monomer (x) and the monomer (y) will be described in detail later.

The copolymer (A) preferably has a radical polymerizable group. For this reason, the copolymer (A) can be crosslinked by ultraviolet rays or heat by mixing a component generating radical (reaction initiator and the like to be described later) by ultraviolet rays or heat, and in a case of crosslinking and adhesive layer obtained by using an adhesive resin composition including the copolymer (A), high crosslinking density is obtained and an adhesive layer excellent in holding force is obtained. The radical polymerizable group will be described in detail later. The radical polymerizable group that the copolymer (A) has may be one kind, or may be two or more kinds.

The radical polymerizable group may be included in the constituent unit of the copolymer (A), may be included in a main chain end, or may be included in both thereof. From a viewpoint of improving holding force, the radical polymerizable group is preferably included in at least the constituent unit. That is, the copolymer (A) preferably has a constituent unit having the radical polymerizable group.

In the constituent unit having the radical polymerizable group, the radical polymerizable group is generally included in a lateral group.

In the copolymer (A), a part of the constituent units that the macromonomer (a) has and the constituent unit derived from the vinyl monomer (b) preferably has the radical polymerizable group.

That is, not all of the constituent units that the macromonomer (a) has and the constituent unit derived from the vinyl monomer (b) have a radical polymerizable group. The constituent units that the macromonomer (a) has and the constituent unit derived from the vinyl monomer (b) include a constituent unit having a radical polymerizable group and a constituent unit not having a radical polymerizable group. By including the constituent unit not having a radical polymerizable group, functions as an adhesive such as adhesiveness can be expressed.

The constituent unit having a radical polymerizable group may be included in any one of the constituent units that the macromonomer (a) has and the constituent unit derived from the vinyl monomer (b), or may be included in both thereof. Similarly, the constituent unit not having a radical polymerizable group may be included in any one of the constituent units that the macromonomer (a) has and the constituent unit derived from the vinyl monomer (b), or may be included in both thereof.

The constituent units that the macromonomer (a) has are constituent units derived from a monomer (hereinafter, "monomer (a1)") having a radical polymerizable group. The monomer (a1) will be described in detail later. A constituent unit derived from the monomer (a1) may be a constituent unit formed by polymerizing the monomer (a1), or may be a constituent unit formed by exchanging a part of the structure of the constituent unit with another structure.

Similarly, the constituent unit derived from the vinyl monomer (b) may be a constituent unit formed by polymerizing the vinyl monomer (b), or may be a constituent unit formed by exchanging a part of the structure of the constituent unit with another structure.

The constituent unit having a radical polymerizable group is typically a constituent unit formed by exchanging a part of the structure of the constituent unit formed by polymerizing a monomer (monomer (a1) or vinyl monomer (b)) with a structure having a radical polymerizable group.

<Macromonomer (a)>

The macromonomer (a) is a compound having two or more constituent units derived from a monomer (hereinafter, referred to as "monomer (a1)") having a radical polymerizable group and having an additional reactive functional group such as a radical polymerizable group, a hydroxyl group, a isocyanate group, an epoxy group, a carboxylic group, an amino group, an amide group, a thiol group, an acid anhydride group, and a carbodiimide group.

The monomer (a1) will be described in detail later. The two or more constituent units that the macromonomer (a) has may be the same as one another, or may be different from one another.

In a case where the macromonomer (a) has the radical polymerizable group, it is possible to obtain the copolymer (A) by copolymerizing the macromonomer (a) and the vinyl monomer (b) by a radical polymerization.

In a case where the macromonomer (a) has the additional reactive functional group, the vinyl monomer (b) generally includes a vinyl monomer having a functional group capable of reacting with the additional reactive functional group. It is possible to obtain the copolymer (A) by reacting a functional group of a polymer formed of the constituent unit derived from the vinyl monomer (b) and macromonomer having the additional reactive functional group with each other.

As a combination of the additional reactive functional group and a functional group capable of reacting with the functional group, the following combination is exemplified.

Combination of a hydroxyl group and a carboxylic group or acid anhydride group.

Combination of an isocyanate group and a carboxylic group or hydroxyl group or thiol group.

Combination of an epoxy group and an amino group.

Combination of a carboxylic group and an epoxy group or carbodiimide group.

Combination of an amino group and a carboxylic group.

Combination of an amide group and a carboxylic group.

Combination of a thiol group and an epoxy group.

In a case where the macromonomer (a) has a radical polymerizable group, the radical polymerizable group in the macromonomer (a) may be one, or may be two or more, but is preferably one. Also, in a case where the macromonomer (a) has the additional reactive functional group, the additional reactive functional group in macromonomer (a) may be one, or may be two or more, but is preferably one.

The macromonomer (a) may have any one of the radical polymerizable group and the additional reactive functional group, or may have both thereof. In a case where the macromonomer (a) has both of the radical polymerizable group and the additional reactive functional group, each of the radical polymerizable group and the functional group that macromonomer (a) has may be one, or may be two or more.

The macromonomer (a) may have the radical polymerizable group and the functional group in a repeating unit, or may have the radical polymerizable group and the functional group in an end. However, from a viewpoint of easily adjusting viscosity of the adhesive resin composition, the macromonomer (a) preferably has the radical polymerizable group and the functional group only in an end.

The macromonomer (a) preferably has a radical polymerizable group, from a viewpoint of capable of copolymerization with the vinyl monomer (b). In a case where the copolymer (A) is a copolymerization product between the macromonomer (a) and the vinyl monomer (b), the copolymer (A) is excellent in that an introduction amount of the macromonomer (a) is easily controlled and corrosion due to a remaining functional group can be reduced, compared to a case where the copolymer (A) is a reaction product between a functional group of a polymer formed of a constituent unit derived from vinyl monomer (b) and a macromonomer having the additional reactive functional group.

<Radical Polymerizable Group>

As the radical polymerizable group that macromonomer (a) has, a group having an ethylenic unsaturated bond is preferable. As the group having an ethylenic unsaturated bond, $CH_2=C(COOR)-CH_2-$, a (meth)acryloyl group, a 2-(hydroxymethyl)acryloyl group, a vinyl group, and the like are exemplified.

Here, R represents a hydrogen atom, an alkyl group having a non-substituted or substituted group, an alicyclic group having a non-substituted or substituted group, an aryl group having a non-substituted or substituted group, a heteroaryl group having a non-substituted or substituted group, a non-aromatic heterocyclic group having a non-substituted or substituted group, an aralkyl group having a non-substituted or substituted group, an alkaryl group having a non-substituted or substituted group, an organosilyl group having a non-substituted or substituted group, or a (poly)organosiloxane group having a non-substituted or substituted group.

As the non-substituted alkyl group in R, a branched or straight-chain alkyl group having 1 to 22 carbon atoms is exemplified. Specific examples of the branched or straight-chain alkyl group having 1 to 22 carbon atoms include a methyl group, an ethyl group, an n-propyl group, an i-propyl group, an n-butyl group, a t-butyl group, an i-butyl group, a pentyl group (amyl group), an i-pentyl group, a hexyl group, a heptyl group, a 2-ethylhexyl group, an octyl group, an i-octyl group, a nonyl group, a i-nonyl group, a decyl group, an i-decyl group, an undecyl group, a dodecyl group (lauryl group), a tridecyl group, a tetradecyl group, a pentadecyl group, a hexadecyl group, a heptadecyl group, an octadecyl group (stearyl group), an i-octadecyl group, a nonadecyl group, an icosyl group, a docosyl group, and the like.

The non-substituted alicyclic group in R may be a monocyclic group, or may be a polycyclic group, and for example, an alicyclic group having 3 to 20 carbon atoms is exemplified. As the alicyclic group, a saturated alicyclic group is preferable, and specific examples thereof include a cyclopropyl group, a cyclobutyl group, a cyclopentyl group, a cyclohexyl group, a cycloheptyl group, a bicyclo [2.2.1] heptyl group, a cyclooctyl group, an adamantyl group, and the like.

As the non-substituted aryl group in R, for example, an aryl group having 6 to 18 carbon atoms is exemplified. Specific examples of the aryl group having 6 to 18 carbon atoms include a phenyl group and a naphthyl group.

As the non-substituted heteroaryl group in R, for example, a pyridyl group, a carbazolyl group, and the like are exemplified.

As the non-substituted non-aromatic heterocyclic group, for example, a pyrrolidinyl group, a pyrrolidone group, a lactam group, and the like are exemplified.

As the non-substituted aralkyl group, for example, a benzyl group, a phenylethyl group, and the like are exemplified.

As the non-substituted organosilyl group, for example, —SiR$^{17}$R$^{18}$R$^{19}$ (Here, R$^{17}$ to R$^{19}$ each independently represent an alkyl group having a non-substituted or substituted group, an alicyclic group having a non-substituted or substituted group, or an aryl group having a non-substituted or substituted group) is exemplified.

As the alkyl group having a non-substituted or substituted group in R$^{17}$ to R$^{19}$, for example, a methyl group, an ethyl group, an n-propyl group, an n-butyl group, an n-amyl group, an n-hexyl group, an n-octyl group, an n-dodecyl group, a stearyl group, a lauryl group, an isopropyl group, an isobutyl group, an s-butyl group, a 2-methylisopropyl group, a benzyl group, and the like are exemplified. As the alicyclic group having a non-substituted or substituted group, the same as above-described ones are exemplified, for example, a cyclohexyl group and the like are exemplified. As the aryl group having a non-substituted or substituted group, the same as above-described ones are exemplified, for example, a phenyl group, a p-methylphenyl group, and the like are exemplified. R$^{17}$ to R$^{19}$ each independently may be the same as one another, or may be different from one another.

As the non-substituted (poly)organosiloxane group, for example, —SiR$^{30}$R$^{31}$—OR$^{32}$ and —(SiR$^{33}$R$^{34}$—O—)N—R$^{35}$ (Here, R$^{30}$ to R$^{35}$ each independently represent an alkyl group having a non-substituted or substituted group, an alicyclic group having a non-substituted or substituted group, or an aryl group having a non-substituted or substituted group) are exemplified.

As the alkyl group, an alicyclic group, an aryl group having a non-substituted or substituted group in R$^{30}$ to R$^{35}$, and the same as above-described ones are exemplified.

Examples of the substituted group in R (a substituted group in each of an alkyl group having a substituted group, an alicyclic group having a substituted group, an aryl group having a substituted group, a heteroaryl group having a substituted group, a non-aromatic heterocyclic group having a substituted group, an aralkyl group having a substituted group, an alkaryl group having a substituted group, and an organosilyl group having a substituted group) include at least one selected from the group consisting of an alkyl group (here, excluding a case where R is an alkyl group having a substituted group), an aryl group, —COOR$^{11}$, a cyano group, —OR$^{12}$, —NR$^{13}$R$^{14}$, —CONR$^{15}$R$^{16}$, a halogen atom, an aryl group, an epoxy group, a siloxy group, and a group having hydrophilicity or ionicity.

Here, R$^{11}$ to R$^{16}$ each independently represent a hydrogen atom, an alkyl group having a non-substituted or substituted group, an alicyclic group having a non-substituted or substituted group, or an aryl group having a non-substituted or substituted group. As the groups, the same as above-described ones are exemplified.

As the alkyl group and the aryl group in the substituted groups, the same as the non-substituted alkyl group and the non-substituted aryl group are exemplified.

As R$^{11}$ of —COOR$^{11}$ in the substituted groups, a hydrogen atom and a non-substituted alkyl group are preferable. That is, as —COOR$^{11}$, a carboxy group or an alkoxy carbonyl group is preferable. As the alkoxy carbonyl group, for example, a methoxycarbonyl group is exemplified.

As R$^{12}$ of —OR$^{12}$ in the substituted groups, a hydrogen atom or a non-substituted alkyl group is preferable. That is, as —OR$^{12}$, a hydroxy group or an alkoxy group is preferable. As the alkoxy group, for example, an alkoxy group having 1 to 12 carbon atoms is exemplified, and specific examples thereof include a methoxy group and the like.

As —NR$^{13}$R$^{14}$ in the substituted groups, for example, an amino group, a monomethyl amino group, a dimethyl amino group, and the like are exemplified.

As —CONR$^{15}$R$^{16}$ in the substituted group, for example, a carbamoyl group (—CONH$_2$), a N-methyl carbamoyl group (—CONHCH$_3$), N, N-dimethyl carbamoyl group (dimethyl amide group: —CON(CH$_3$)$_2$), and the like are exemplified.

As the halogen atom in the substituted groups, for example, a fluorine atom, a chlorine atom, a bromine atom, an iodine atom, and the like are exemplified.

As the group having hydrophilicity and ionicity in the substituted groups, for example, alkali salt of a carboxy group or alkali salt of a sulfoxy group, a poly(alkylene oxide) group such as polyethylene oxide group and polypropylene oxide group, a cationic substituted group such as quaternary ammonium base, and the like are exemplified.

As R, an alkyl group having a non-substituted or substituted group, or an alicyclic group having a non-substituted or substituted group is preferable, and a non-substituted alkyl group or an alicyclic group having an alkyl group as a non-substituted or substituted group is more preferable.

Among these, from a viewpoint of ease of acquisition, a methyl group, an ethyl group, an n-propyl group, an i-propyl group, an n-butyl group, a t-butyl group, a pentyl group, a hexyl group, a heptyl group, an octyl group, a cyclopropyl group, a cyclobutyl group, an isobornyl group, and an adamantyl group are preferable, and a methyl group, an ethyl group, an n-propyl group, an i-propyl group, an n-butyl group, a t-butyl group, a cyclopropyl group, a cyclobutyl group, an isobornyl group, and an adamantyl group are more preferable.

As the radical polymerizable group that the monomer (a1) has, a group having an ethylenic unsaturated bond is preferable, similar to the radical polymerizable group that the macromonomer (a) preferably has. That is, the monomer (a1) is preferably a vinyl monomer.

As the monomer (a1), the monomer (x) and the monomer (y) are exemplified. The monomer (x) is a monomer having an amide bond. As the monomer (x), an amide bond-containing vinyl monomer is preferable, and examples thereof include an amide bond-containing chain vinyl monomer such as (meth)acrylamide, N,N-dimethyl (meth)acrylamide, N,N-diethyl (meth)acrylamide, N-isopropyl (meth)acrylamide, N-t-butyl (meth)acrylamide, N-t-octyl (meth)acrylamide, N-methylol (meth)acrylamide, hydroxyethyl (meth)acrylamide, N-methoxymethyl (meth)acrylamide, N-butoxy methyl (meth)acrylamide, diacetone (meth)acrylamide, N,N-dimethyl amino ethyl (meth)acrylamide, N,N-dimethylaminopropyl (meth)acrylamide, N-vinyl acetamide, maleic acid amide, and N,N'-methylene bis(meth)acrylamide; and an amide bond-containing alicyclic vinyl monomer such as (meth)acryloyl morpholine, N-vinyl pyrrolidone, N-vinyl-ε-caprolactone, and maleimide.

Among these, from a viewpoint of wet heat clouding resistance, (meth)acrylamide is preferable.

The monomer (y) is a monomer other than the monomer (x). That is, the monomer (y) is a monomer not containing an amide bond. As the monomer (y), various monomers are used, for example, the following monomers are exemplified.

Hydrocarbon group-containing (meth)acrylic acid ester such as methyl (meth)acrylate, ethyl (meth)acrylate, n-propyl (meth)acrylate, isopropyl (meth)acrylate, n-butyl (meth) acrylate, isobutyl (meth)acrylate, t-butyl (meth)acrylate, isoamyl (meth)acrylate, hexyl (meth)acrylate, 2-ethylhexyl (meth)acrylate, octyl (meth)acrylate, isooctyl (meth)acrylate, nonyl (meth)acrylate, isononyl (meth)acrylate, decyl (meth)acrylate, isodecyl (meth)acrylate, lauryl (meth)acrylate, hexadecyl (meth)acrylate, stearyl (meth)acrylate, isostearyl (meth)acrylate, phenyl (meth)acrylate, benzyl (meth)acrylate, cyclohexyl (meth)acrylate, tetrahydrofurfuryl (meth)acrylate, isobornyl (meth)acrylate, (meth)acrylate 3,5,5-trimethylcyclohexyl, dicyclopentanyl (meth)acrylate, dicyclopentenyl (meth)acrylate, dicyclopentenyloxy ethyl (meth)acrylate, terpene acrylate or derivatives thereof, hydrogenated rosin acrylate or derivatives thereof, and docosyl (meth)acrylate;

hydroxy group-containing (meth)acrylic acid ester such as 2-hydroxyethyl (meth)acrylate, 2-hydroxypropyl (meth)acrylate, 2-hydroxybutyl (meth)acrylate, 3-hydroxybutyl (meth)acrylate, 4-hydroxybutyl (meth)acrylate, and glycerol (meth)acrylate;

a carboxyl group-containing vinyl monomer such as (meth)acrylate, 2-(meth)acryloyloxy ethyl hexahydrophthalic acid, 2-(meth)acryloyloxy propyl hexahydrophthalic acid, 2-(meth)acryloyloxyethyl phthalic acid, 2-(meth)acryloyloxy propyl phthalic acid, 2-(meth)acryloyloxy ethyl maleic acid, 2-(meth)acryloyloxy propyl maleic acid, 2-(meth)acryloyloxy ethyl succinic acid, 2-(meth)acryloyloxy propyl succinic acid, crotonic acid, fumaric acid, maleic acid, itaconic acid, citraconic acid, monomethyl maleate, monoethyl maleate, monooctyl maleate, monomethyl itaconate, monoethyl itaconate, monobutyl itaconate, monooctyl itaconate, monomethyl fumarate, monoethyl fumarate, monobutyl fumarate, monooctyl fumarate, and monoethyl citraconate;

an acid anhydride group-containing vinyl monomer such as maleic anhydride and itaconic anhydride; unsaturated dicarboxylic acid diester monomer such as dimethyl maleate, dibutyl maleate, dimethyl fumarate, dibutyl fumarate, dibutyl itaconate, and di-perfluoro cyclohexyl fumarate;

an epoxy group-containing vinyl monomer such as glycidyl (meth)acrylate, glycidyl α-ethyl acrylate, and 3,4-epoxybutyl (meth)acrylate;

an amino group-containing (meth)acrylic acid ester such as dimethyl amino ethyl (meth)acrylate and diethylamino ethyl (meth)acrylate;

a polyfunctional vinyl monomer such as divinylbenzene, ethylene glycol di(meth)acrylate, 1,3-butylene glycol di(meth)acrylate, 1,4-butanediol di(meth)acrylate, 1,6-hexanediol di(meth)acrylate, di ethylene glycol di(meth)acrylate, triethylene glycol di(meth)acrylate, tetraethylene glycol di(meth)acrylate, polyethylene glycol di(meth)acrylate, tripropylene glycol di(meth)acrylate, neopentyl glycol di(meth)acrylate, 1,9-nonanediol di(meth)acrylate, 1,10-decanediol di(meth)acrylate, trimethylolpropane tri(meth)acrylate, pentaerythritol tetra(meth)acrylate, dipentaerythritol hexa(meth)acrylate, aryl(meth)acrylate, triallyl cyanurate, diallyl maleate, and polypropylene glycol diallyl ether;

a heterocyclic monomer such as vinyl pyridine and vinyl carbazole; a silane coupling agent-containing monomer such as polyethylene glycol (meth)acrylate, polypropylene glycol (meth)acrylate, methoxyethyl (meth)acrylate, ethoxy ethyl (meth)acrylate, n-butoxy ethyl (meth)acrylate, isobutoxy ethyl (meth)acrylate, t-butoxy ethyl (meth)acrylate, ethoxy ethoxy ethyl (meth)acrylate, phenoxy ethyl (meth)acrylate, nonyl phenoxy ethyl (meth)acrylate, 3-methoxy butyl (meth)acrylate, acetoxy ethyl (meth)acrylate, a glycol ester monomer such as "Placed FM" (caprolactone-added monomer manufactured by Daicel Chemical Industries, Ltd., product name), "Blemmer PME-100" (methoxy polyethylene glycol methacrylate (in which ethylene glycol chain is 2) manufactured by Nippon Oil & Fats Co., Ltd., product name), "Blemmer PME-200" (methoxy polyethylene glycol methacrylate (in which ethylene glycol chain is 4) manufactured by Nippon Oil & Fats Co., Ltd., product name), "Blemmer PME-400" (methoxy polyethylene glycol methacrylate (in which ethylene glycol chain is 9) manufactured by Nippon Oil & Fats Co., Ltd., product name), "Blemmer 50POEP-800B" (octoxy polyethylene glycol polypropylene glycol methacrylate (in which ethylene glycol chain is 8, propylene glycol chain is 6) manufactured by Nippon Oil & Fats Co., Ltd., product name), "Blemmer 20ANEP-600" (nonyl phenoxy (ethylene glycol polypropylene glycol) monoacrylate manufactured by Nippon Oil & Fats Co., Ltd., product name), "Blemmer AME-100" (manufactured by Nippon Oil & Fats Co., Ltd., product name), "Blemmer AME-200" (manufactured by Nippon Oil & Fats Co., Ltd., product name), and "Blemmer 50AOEP-800B" (manufactured by Nippon Oil & Fats Co., Ltd., product name), 3-(meth)acryloxy propyl trimethoxy silane, 3-(meth)acryloxy propyl methyl diethoxy silane, 3-(meth)acryloxy propyl triethoxy silane, 3-acryloxypropyl trimethoxy silane, vinyl trimethoxy silane, and vinyl triethoxy silane;

an organosilyl group-containing monomer other than a silane coupling agent-containing monomer, such as trimethylsilyl (meth)acrylate, triethylsilyl (meth)acrylate, tri-n-propyl silyl (meth)acrylate, tri-n-butylsilyl (meth)acrylate, tri-n-amylsilyl (meth)acrylate, tri-n-hexylsilyl (meth)acrylate, tri-n-octylsilyl (meth)acrylate, tri-n-dodecylsilyl (meth)acrylate, triphenylsilyl (meth)acrylate, tri-p-methylphenylsilyl (meth)acrylate, tribenzylsilyl (meth)acrylate, triisopropylsilyl (meth)acrylate, triisobutylsilyl (meth)acrylate, tri-s-butylsilyl (meth)acrylate, tri-2-methylisopropylsilyl (meth)acrylate, tri-t-butylsilyl (meth)acrylate, ethyldimethylsilyl (meth)acrylate, n-butyldimethylsilyl (meth)acrylate, diisopropyl-n-butylsilyl (meth)acrylate, n-octyl di-n-butylsilyl (meth)acrylate, diisopropyl stearylsilyl (meth)acrylate, dicyclohexyl phenylsilyl (meth)acrylate, t-butyldiphenylsilyl (meth)acrylate, lauryldiphenylsilyl (meth)acrylate, triisopropylsilyl methyl maleate, triisopropylsilyl amyl maleate, tri-n-butylsilyl-n-butyl maleate, t-butyldiphenylsilyl methyl maleate, t-butyldiphenylsilyl-n-butyl maleate, triisopropylsilyl methyl fumarate, triisopropylsilyl amyl fumarate, tri-n-butylsilyl-n-butyl fumarate, t-butyl diphenylsilyl methyl fumarate, t-butyl diphenylsilyl-n-butyl fumarate, Silaplane FM-0711 (manufactured by JNC Corporation, product name), Silaplane FM-0721 (manufactured by JNC Corporation, product name), Silaplane FM-0725 (manufactured by JNC Corporation, product name), Silaplane TM-0701 (manufactured by JNC Corporation, product name), Silaplane TM-0701T (manufactured by JNC Corporation, product name), X-22-174ASX (manufactured by Shin-Etsu Chemical Co. Ltd., product name), X-22-174BX (manufactured by Shin-Etsu Chemical Co. Ltd., product name), KF-2012 (manufactured by Shin-Etsu Chemical Co. Ltd., product name), X-22-2426 (manufactured by Shin-Etsu Chemical Co. Ltd., product name), and X-22-2404 (manufactured by Shin-Etsu Chemical Co. Ltd., product name);

halogenated olefin such as vinyl chloride, vinylidene chloride, vinyl fluoride, vinylidene fluoride, and chlorotrifluoroethylene; an isocyanate group-containing monomer such 2-isocyanate ethyl (meth)acrylate; a fluorine-containing monomer (here, excluding halogenated olefin) such as 2,2,2-trifluoroethyl (meth)acrylate, 2,2,3,3,3-pentafluorophenyl (meth)acrylate, 2-(perfluorobutyl) ethyl (meth)acrylate, 3-(perfluorobutyl)-2-hydroxypropyl (meth)acrylate, 2-(perfluorohexyl) ethyl (meth)acrylate, 3-perfluorohexyl-2-hydroxypropyl (meth)acrylate, 3-(perfluoro-3-methyl-butyl)-2-hydroxypropyl (meth)acrylate, 2,2,3,3-tetrafluoropropyl (meth)acrylate, 1H,1H,5H-octafluoropenthyl (meth)acrylate, 1H,1H,5H-octafluoropenthyl (meth)methacrylate, 1H,1H,2H,2H-tridecafluorooctyl (meth)acrylate, 1H-1-(trifluoromethyl)trifluoroethyl (meth)acrylate, 1H,1H,3H-hexafluorobutyl (meth)acrylate, and 1,2,2,2-tetrafluoro-1-(trifluoromethyl) ethyl (meth)acrylate; a monomer having an acetal structure such as 1-butoxyethyl (meth)acrylate, 1-(2-ethylhexyloxy)ethyl (meth)acrylate, 1-(cyclohexyloxy)ethyl methacrylate), and 2-tetrahydropyranyl (meth)acrylate;

and other vinyl monomers such as 4-methacryloyloxybenzophenone, styrene, α-methyl styrene, vinyl toluene, (meth)acrylonitrile, vinyl chloride, vinyl acetate, and vinyl propionate.

Among these, as the monomer (a1) used in the macromonomer (a), methyl methacrylate, n-butyl methacrylate, i-butyl methacrylate, t-butyl-methacrylate, 2-hydroxyethyl methacrylate, isobornyl methacrylate, and cyclohexyl methacrylate are preferable from a viewpoint of high holding force of the adhesive.

The monomer (a1) may be used alone, or two or more thereof may be used in combination.

In a case where the vinyl monomer (b) does not include the monomer (x), the monomer (a1) preferably include the monomer (x). In a case where the vinyl monomer (b) includes the monomer (x), the monomer (a1) may include the monomer (x), or may not include the monomer (x).

At least a part of the monomer (a1) is preferably a (meth)acrylic monomer.

As the constituent unit derived from the monomer (a1), a constituent unit represented by the following formula (a') (hereinafter, referred to as "constituent unit (a')") is preferable. That is, the macromonomer (a) has a radical polymerizable group, and preferably has two or more constituent units (a').

[Chem. 4]

(a')

(In the formula, $R^1$ represents a halogen atom, a methyl group, or $CH_2OH$, $R^2$ represents $OR^3$, a halogen atom, $COR^4$, $COOR^5$, CN, $CONR^6R^7$, $NHCOR^8$ or $R^9$, $R^3$ to $R^8$ each independently represent a hydrogen atom, an alkyl group having a non-substituted or substituted group, an alicyclic group having a non-substituted or substituted group, an aryl group having a non-substituted or substituted group, a heteroaryl group having a non-substituted or substituted group, a non-aromatic heterocyclic group having a non-substituted or substituted group, an aralkyl group having a non-substituted or substituted group, an alkaryl group having a non-substituted or substituted group, an organosilyl group having a non-substituted or substituted group, and a (poly)organosiloxane group having a non-substituted or substituted group, each of the substituted group in the groups is at least one selected from the group consisting of an alkyl group, an aryl group, a heteroaryl group, a non-aromatic heterocyclic group, an aralkyl group, an alkaryl group, a carboxylic acid group (COOH), a carboxylic acid ester group, an epoxy group, a hydroxy group, an alkoxy group, a primary amino group, a secondary amino group, a tertiary amino group, an isocyanate group, a sulfonic acid group ($SO_3H$), a carbodiimide group, an acid anhydride group, and a halogen atom, $R^9$ represents an aryl group having a non-substituted or substituted group, a heteroaryl group having a non-substituted or substituted group, or a non-aromatic heterocyclic group having a non-substituted or substituted group, each of the substituted group in the groups is at least one selected from the group consisting of an alkyl group, an aryl group, a heteroaryl group, a non-aromatic heterocyclic group, an aralkyl group, an alkaryl group, a carboxylic acid group, a carboxylic acid ester group, an epoxy group, a hydroxy group, an alkoxy group, a primary amino group, a secondary amino group, a tertiary amino group, an isocyanate group, a sulfonic acid group, an olefin group having a non-substituted or substituted group, and a halogen atom.)

Each of the non-substituted alkyl group, the non-substituted alicyclic group, the non-substituted aryl group, the non-substituted heteroaryl group, the non-substituted non-aromatic heterocyclic group, the non-substituted aralkyl group, the non-substituted alkaryl group, the non-substituted organosilyl group, the non-substituted (poly)organosiloxane group in $R^3$ to $R^8$ is the same as those exemplified in R.

Each of the non-substituted aryl group, the non-substituted heteroaryl group, the non-substituted non-aromatic heterocyclic group in $R^9$ is the same as those exemplified in R.

Among the substituted groups (substituted group in each of an alkyl group having a substituted group, an alicyclic group having a substituted group, an aryl group having a substituted group, a heteroaryl group having a substituted group, a non-aromatic heterocyclic group having a substituted group, an aralkyl group having a substituted group, an alkaryl group having a substituted group, and an organosilyl group having a substituted group) in $R^3$ to $R^8$, each of the alkyl group, the aryl group, the heteroaryl group, the non-aromatic heterocyclic group, the aralkyl group, the alkaryl group, and the halogen atom is the same as those exemplified above.

As the group having a radical polymerizable group, for example, a structure obtained by additionally reacting a functional group such as a hydroxyl group, an isocyanate group, an epoxy group, a carboxylic group, an amino group, an amide group, a thiol group, an acid anhydride group, a carbodiimide group with a monomer having a functional group capable of additionally reacting with the functional group and a radical polymerizable group is exemplified. As the monomer having a functional group capable of additional reaction and a radical polymerizable group, a monomer having a hydroxyl group, an isocyanate group, an epoxy group, a carboxylic group, an amino group, an amide group, a thiol group, an acid anhydride group, and a carbodiimide group, among those described in monomer (a1), is exemplified.

As the carboxylic acid ester group, for example, a group in which $R^{11}$ of the $-COOR^{11}$ is an alkyl group having a non-substituted or substituted group, an alicyclic group having a non-substituted or substituted group, or an aryl group having a non-substituted or substituted group is exemplified.

As the alkoxy group, a group in which $R^{12}$ of the —$OR^{12}$ is a non-substituted alkyl group is exemplified.

As the secondary amino group, a group in which $R^{13}$ of the —$NR^{13}R^{14}$ is a hydrogen atom, and $R^{14}$ is an alkyl group having a non-substituted or substituted group, an alicyclic group having a non-substituted or substituted group, or an aryl group having a non-substituted or substituted group is exemplified.

As the tertiary amino group, a group in which each of $R^{13}$ and $R^{14}$ of the —$NR^{13}R^{14}$ is an alkyl group having a non-substituted or substituted group, an alicyclic group having a non-substituted or substituted group, or an aryl group having a non-substituted or substituted group is exemplified.

Each of the non-substituted aryl group, the non-substituted heteroaryl group, and the non-substituted non-aromatic heterocyclic group in $R^9$ is the same as those exemplified above.

Among the substituted groups (substituted group in each of the aryl group having a substituted group, the heteroaryl group having a substituted group, and the non-aromatic heterocyclic group having a substituted group) in $R^9$, each of the alkyl group, the aryl group, the heteroaryl group, the non-aromatic heterocyclic group, the aralkyl group, the alkaryl group, the carboxylic acid ester group, the alkoxy group, the primary amino group, the secondary amino group, the tertiary amino group, the halogen atom is the same as those exemplified above.

As the non-substituted olefin group, for example, an aryl group and the like are exemplified.

As a substituted group in the olefin group having a substituted group, the same as the substituted groups in $R^9$ are exemplified.

The constituent unit (a') is a constituent unit derived from $CH_2=CR^1R^2$.

$CH_2=CR^1R^2$ may be the monomer (x), or may be the monomer (y). Both thereof may be used in combination. $CH_2=CR^1R^2$ may be a constituent unit formed by modifying $R^2$ of the constituent unit to another $R^2$.

Specific examples of $CH_2=CR^1R^2$ which is the monomer (x) include the following ones.

(Meth)acrylamide, N,N-dimethyl (meth)acrylamide, N,N-diethyl (meth)acrylamide, N-isopropyl (meth)acrylamide, N-t-butyl (meth)acrylamide, N-t-octyl (meth)acrylamide, N-methylol (meth)acrylamide, hydroxy ethyl (meth)acrylamide, N-methoxymethyl (meth)acrylamide, N-butoxy methyl (meth)acrylamide, diacetone (meth)acrylamide, N,N-dimethyl amino ethyl (meth)acrylamide, N,N-dimethyl amino propyl (meth)acrylamide, N-vinyl acetamide, N,N'-methylene bis(meth)acrylamide, (meth)acryloyl morpholine, N-vinyl pyrrolidone, N-vinyl-ε-caprolactam, and the like.

Specific examples of $CH_2=CR^1R^2$ which is the monomer (y) include the following ones. $CH_2=CR^1R^2$ may be a constituent unit formed by modifying $R^2$ of the constituent unit to another $R^2$.

A hydrophobic group-containing (meth)acrylic acid ester monomer such as substituted or non-substituted alkyl (meth)acrylate [for example, methyl (meth)acrylate, ethyl (meth)acrylate, n-propyl (meth)acrylate, i-propyl (meth)acrylate, n-butyl (meth)acrylate, i-butyl (meth)acrylate, t-butyl (meth)acrylate, 2-ethylhexyl (meth)acrylate, lauryl (meth)acrylate, stearyl (meth)acrylate, behenyl (meth)acrylate, 1-methyl-2-methoxyethyl (meth)acrylate, 3-methoxybutyl (meth)acrylate, 3-methyl-3-methoxybutyl (meth)acrylate], substituted or non-substituted aralkyl (meth)acrylate [for example, benzyl (meth)acrylate, m-methoxy phenylethyl (meth)acrylate, p-methoxy phenylethyl (meth)acrylate], substituted or non-substituted aryl (meth)acrylate [for example, phenyl (meth)acrylate, m-methoxyphenyl (meth)acrylate, p-methoxyphenyl (meth)acrylate, o-methoxy phenylethyl (meth)acrylate], alicyclic (meth)acrylate [for example, isobornyl (meth)acrylate, cyclohexyl (meth)acrylate], and halogen atom-containing (meth)acrylate [for example, trifluoroethyl (meth)acrylate, perfluorooctyl (meth)acrylate, perfluorocyclohexyl (meth)acrylate];

an oxyethylene group-containing (meth)acrylic acid ester monomer such as 2-methoxyethyl (meth)acrylate, 2-ethoxyethyl (meth)acrylate, 2-butoxyethyl (meth)acrylate, butoxy diethylene glycol (meth)acrylate, methoxy triethylene glycol (meth)acrylate, methoxy polyethylene glycol (meth)acrylate, and phenoxy ethyl (meth)acrylate, 2-(2-ethylhexaoxy) ethyl (meth)acrylate;

a hydroxy group-containing (meth)acrylic acid ester monomer such as 2-hydroxyethyl (meth)acrylate, 2-hydroxypropyl (meth)acrylate, and 4-hydroxybutyl (meth)acrylate, glycerol (meth)acrylate;

an end alkoxy arylated polyether monomer such as methoxy polyethylene glycol aryl ether, methoxy polypropylene glycol aryl ether, butoxy polyethylene glycol aryl ether, butoxy polypropylene glycol arylether, methoxypolyethylene glycol polypropylene glycol aryl ether, and butoxy polyethylene glycol polypropylene glycol aryl ether;

an epoxy group-containing vinyl monomer such as glycidyl (meth)acrylate, glycidyl α-ethyl glycidyl acrylate, and 3,4-epoxy butyl (meth)acrylate;

a primary or secondary amino group-containing vinyl monomer such as butyl amino ethyl (meth)acrylate;

a tertiary amino group-containing vinyl monomer such as dimethyl amino ethyl (meth)acrylate, diethyl amino ethyl (meth)acrylate, dimethyl amino propyl (meth)acrylate, dimethyl amino butyl (meth)acrylate, and dibutyl amino ethyl (meth)acrylate;

a heterocyclic basic monomer such as vinyl pyridine and vinyl carbazole;

an organosilyl group-containing vinyl monomer such as trimethylsilyl (meth)acrylate, triethylsilyl (meth)acrylate, tri-n-propylsilyl (meth)acrylate, tri-n-butylsilyl (meth)acrylate, tri-n-amylsilyl (meth)acrylate, tri-n-hexylsilyl (meth)acrylate, tri-n-octylsilyl (meth)acrylate, tri-n-dodecylsilyl (meth)acrylate, triphenylsilyl (meth)acrylate, tri-p-methyl phenyl silyl (meth)acrylate, tribenzylsilyl (meth)acrylate, triisopropylsilyl (meth)acrylate, triisobutylsilyl (meth)acrylate, tri-s-butylsilyl (meth)acrylate, tri-2-methylisopropylsilyl (meth)acrylate, tri-t-butylsilyl (meth)acrylate, ethyl dimethylsilyl (meth)acrylate, n-butyl dimethylsilyl (meth)acrylate, diisopropyl-n-butylsilyl (meth)acrylate, n-octyl di-n-butylsilyl (meth)acrylate, diisopropyl stearylsilyl (meth)acrylate, dicyclohexyl phenylsilyl (meth)acrylate, t-butyl diphenylsilyl (meth)acrylate, and lauryl diphenylsilyl (meth)acrylate;

a carboxy group-containing ethylenic unsaturated monomer such as methacrylic acid, acrylic acid, vinyl benzoic acid, tetrahydrophthalic acid monohydroxyethyl (meth)acrylate, tetrahydrophthalic acid monohydroxy propyl (meth)acrylate, tetrahydrophthalic acid monohydroxy butyl (meth)acrylate, phthalic acid monohydroxy ethyl (meth)acrylate, phthalic acid monohydroxy propyl (meth)acrylate, succinic acid monohydroxy ethyl (meth)acrylate, succinic acid monohydroxy propyl (meth)acrylate, maleic acid monohydroxy ethyl (meth)acrylate, and maleic acid monohydroxy propyl (meth)acrylate;

a cyano group-containing vinyl monomer such as acrylonitrile and methacrylonitrile;

a vinyl ether monomer such as alkyl vinyl ether [for example, ethyl vinyl ether, propyl vinyl ether, butyl vinyl ether, hexyl vinyl ether, 2-ethylhexyl vinyl ether and the like] and cycloalkyl vinyl ether [for example, cyclohexyl vinyl ether and the like]; a vinyl ether monomer such as vinyl acetate, vinyl propionate, vinyl butyrate, and vinyl benzoate;

an aromatic vinyl monomer such as styrene, vinyl toluene, and α-methyl styrene;

halogenated olefin such as vinyl chloride and vinyl fluoride; and the like.

The macromonomer (a) may further have other constituent units than the constituent unit (a'). As other constituent units, for example, a constituent unit derived from a monomer not corresponding to $CH_2=CR^1R^2$ among the monomers exemplified as examples of the monomer (a1) is exemplified.

Preferable specific examples of other constituent units include the constituent unit derived from the following monomers.

An organosilyl group-containing vinyl monomer such as triisopropylsilyl methyl maleate, triisopropylsilyl amyl maleate, tri-n-butylsilyl-n-butyl maleate, t-butyl diphenylsilyl methyl maleate, t-butyl diphenylsilyl-n-butyl maleate, triisopropylsilyl methyl fumarate, triisopropylsilyl amyl fumarate, tri-n-butylsilyl-n-butyl fumarate, t-butyl diphenylsilyl methyl fumarate, and t-butyl diphenylsilyl-n-butyl fumarate;

an acid anhydride group-containing vinyl monomer such as maleic anhydride and itaconic acid anhydride;

a carboxy group-containing ethylenic unsaturated monomer such as crotonic acid, fumaric acid, itaconic acid, maleic acid, citraconic acid, monomethyl maleate, monoethyl maleate, monobutyl maleate, monooctyl maleate, monoethyl itaconic acid, monoethyl itaconic acid, monobutyl itaconic acid, monooctyl itaconic acid, monomethyl fumaric acid, monoethyl fumaric acid, monobutyl fumaric acid, monooctyl fumaric acid, and monoethyl citraconic acid;

an unsaturated dicarboxylic acid diester monomer such as dimethyl maleate, dibutyl maleate, dimethyl fumarate, dibutyl fumarate, dibutyl itaconate, and diperfluorocyclohexyl fumarate;

a halogenated olefin such as vinylidene chloride, vinylidene fluoride, and chlorotrifluoroethylene;

a polyfunctional monomer such as ethylene glycol di(meth)acrylate, diethylene glycol di(meth)acrylate, triethylene glycol di(meth)acrylate, polyethylene glycol di(meth)acrylate, 1,4-butanediol di(meth)acrylate, 1,6-hexanediol di(meth)acrylate, neopentyl glycol di(meth)acrylate, 1,9-nonanediol di(meth)acrylate, 1,10-decanediol di(meth)acrylate, trimethylol propane tri(meth)acrylate, pentaerythritol tetra(meth)acrylate, dipentaerythritol hexa(meth)acrylate, allyl methacrylate, triallyl cyanurate, diallyl maleate, and polypropylene glycol diallyl ether.

A content of the constituent unit derived from the macromonomer (a) is preferably 3% by mass to 60% by mass, more preferably 7% by mass to 40% by mass, further more preferably 8% by mass to 30% by mass, and even further more preferably 9% by mass to 20% by mass, with respect to a total mass (100% by mass) of all the constituent units.

In a case where the content of the constituent unit derived from the macromonomer (a) is equal to or more than 3% by mass with respect to the total mass of the all constituent units, holding force of the adhesive layer becomes favorable, and in a case where the content of the constituent unit derived from the macromonomer (a) is equal to or less than 60% by mass with respect to the total mass of the all constituent units, adhesiveness of the adhesive layer becomes favorable.

The constituent unit derived from a (meth)acrylic monomer included in the macromonomer (a) is preferably equal to or more than 50% by mass, and more preferably equal to or more than 70% by mass, with respect to the total mass (100% by mass) of the all constituent units constituting the macromonomer (a). The upper limit value is not particularly limited, but may be 100% by mass.

As the constituent unit derived from a (meth)acrylic monomer, a constituent unit in which $R^1$ in the formula (a') is a hydrogen atom or a methyl group, and $R^2$ is $COOR^5$ is preferable.

As the macromonomer (a), a macromonomer in which a radical polymerizable group is introduced into an end of a main chain including two or more constituent units (a') is preferable, and a macromonomer represented by the following formula (1) is more preferable. By using a macromonomer having such a structure, it is possible to form an adhesive layer excellent in holding force and with low substrate staining properties.

[Chem. 5]

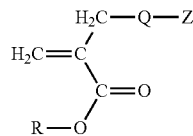

(1)

(In the formula, R represents a hydrogen atom, an alkyl group having a non-substituted or substituted group, an alicyclic group having a non-substituted or substituted group, an aryl group having a non-substituted or substituted group, a heteroaryl group having a non-substituted or substituted group, a non-aromatic heterocyclic group having a non-substituted or substituted group, an aralkyl group having a non-substituted or substituted group, an alkaryl group having a non-substituted or substituted group, an organosilyl group having a non-substituted or substituted group, or a (poly)organosiloxane group having a non-substituted or substituted group, Q represents a main chain portion including two or more constituent units (a'), and Z represents a terminal group.)

In formula (1), R is the same as R in $CH_2=C(COOR)—CH_2—$, and a preferable embodiment is the same.

Each of two or more constituent units (a') included in Q may be the same as each other, or may be different from each other.

Q may be formed of the constituent unit (a'), or may further include other constituent units than the constituent unit (a').

Q preferably includes a constituent unit in which R in the formula (a') is a hydrogen atom or a methyl group, and $R^2$ is $COOR^5$, as the constituent unit (a'). A proportion of the constituent unit is preferably equal to or more than 50% by mass, more preferably equal to or more than 70% by mass, and may be 100% by mass, with respect to a total mass (100% by mass) of all constituent units constituting Q.

The number of the constituent units constituting Q is appropriately set in a range such that a number average molecular weight of the macromonomer (a) is in the range.

As Z, for example, similar to a terminal group of a polymer obtained by a known radical polymerization, a hydrogen atom, a group derived from a radical polymerizable initiator, a radical polymerizable group, and the like are exemplified.

As the macromonomer (a), a macromonomer represented by the following formula (2) is particularly preferable.

[Chem. 6]

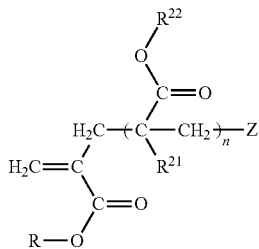

(2)

(In the formula, R and Z are the same as described above, $R^{21}$ represents a hydrogen atom or a methyl group, $R^{22}$ represents an alkyl group having a non-substituted or substituted group, an alicyclic group having a non-substituted or substituted group, an aryl group having a non-substituted or substituted group, a heteroaryl group having a non-substituted or substituted group, an aralkyl group having a non-substituted or substituted group, an alkaryl group having a non-substituted or substituted group, or an organosilyl group having a non-substituted or substituted group, each of the substituted groups in the groups is at least one selected from the group consisting of a group having a radical polymerizable group, an alkyl group, an aryl group, a heteroaryl group, a non-aromatic heterocyclic group, an aralkyl group, an alkaryl group, a carboxylic acid group, a carboxylic acid ester group, an epoxy group, a hydroxy group, an alkoxy group, a primary amino group, a secondary amino group, a tertiary amino group, an isocyanate group, a sulfonic acid group, a carbodiimide group, an acid anhydride group, and a halogen atom, and n represents a natural number of 2 or more.)

In the formula (2), each of R and Z is the same as described above.

Each group in $R^{22}$ is the same as exemplified in $R^5$ of $COOR^5$.

n is a natural number of 2 or more. n is in a range such that a number average molecular weight (Mn) of the macromonomer (a) is from 500 to 100,000. A preferable range of the number average molecular weight is as described below. Each of n $R^{21}$ may be the same as one another, or may be different from one another. Each of n $R^{22}$ may be the same as one another, or may be different from one another.

In a case where the macromonomer (a) has the additional reactive functional group, and the macromonomer is added to a functional group of a polymer formed of a constituent unit derived from the vinyl monomer (b), as the macromonomer (a), a macromonomer having one or more additive reactional functional groups and two or more constituent units (a') is preferable. As the constituent unit (a'), the same one as those in a case where the macromonomer (a) has a radical polymerizable group can be used.

In addition to the macromonomer (a), a compound having a functional group can be added to a functional group of a monomer formed of a constituent unit derived from the vinyl monomer (h). Examples of the compound having a functional group include a silicone-based compound such as X-22-173BX (manufactured by Shin-Etsu Chemical Co. Ltd., product name), X-22-173DX (manufactured by Shin-Etsu Chemical Co. Ltd., product name), X-22-170BX (manufactured by Shin-Etsu Chemical Co. Ltd., product name), X-22-170DX (manufactured by Shin-Etsu Chemical Co. Ltd., product name), X-22-176DX (manufactured by Shin-Etsu Chemical Co. Ltd., product name), X-22-176F (manufactured by Shin-Etsu Chemical Co. Ltd., product name), and X-22-173GX-A (manufactured by Shin-Etsu Chemical Co. Ltd., product name).

A number average molecular weight (Mn) of the macromonomer (a) is 500 to 100,000, preferably 800 to 30,000, more preferably 900 to 10,000, and particularly preferably 1,000 to 6,000. In a case where the number average molecular weight of the macromonomer (a) equal to or more than a lower limit value of the range, holding force of the adhesive layer is more excellent. In a case where the number average molecular weight of the macromonomer (a) is equal to or less than an upper limit value of the range, compatibility with other components as being used as a mixture product for an adhesive, hot melt processability, and the like are more excellent.

The number average molecular weight of the macromonomer (a) is measured by gel filtration chromatography (GPC) using polystyrene as a standard resin.

A glass transition temperature (hereinafter, referred to as "Tga") of the macromonomer (a) is preferably 0° C. to 150° C., more preferably 10° C. to 120° C., and further more preferably 30° C. to 100° C. In a case where Tga is equal to or more than a lower limit value of the range, holding force of the adhesive layer is more excellent. In a case where Tga is equal to or less than an upper limit value of the range, hot melt processability is more excellent.

Tga can be measured by differential scanning calorimetry (DSC).

Tga can be adjusted by composition of a monomer forming the macromonomer (a) and the like.

As the macromonomer (a), a macromonomer produced by a known method may be used, or a commercially available macromonomer may be used.

As a production method of the macromonomer (a) having a radical polymerizable group, for example, a method of production by using a cobalt chain transfer agent, a method using an α substituted unsaturated compound such as α-methyl styrene dimer as a chain transfer agent, a method using an initiator, a method of chemically binding a radical polymerizable group to a polymer, a method by thermal decomposition, and the like are exemplified.

Among these, as the production method of the macromonomer (a) having a radical polymerizable group, a method of production using a cobalt chain transfer agent is preferable from a viewpoint that the number of production steps is small, and the chain transfer constant of a used catalyst is high. The macromonomer (a) in a case of production using a cobalt chain transfer agent has a structure represented by the formula (1).

As the method of producing the macromonomer (a) using a cobalt chain transfer agent, for example, a water-based dispersion polymerization method such as a bulk polymerization method, a solution polymerization method, a suspension polymerization method, and an emulsion polymerization method is exemplified. From a viewpoint that a recovery step is convenient, the water-based dispersion polymerization method is preferable.

As a method of chemically binding a radical polymerizable group to a polymer, for example, a method of production by substituting a halogen group of a polymer having the halogen group with a compound having a radical polymerizable carbon-carbon double bond, a method of reacting a vinyl monomer having an acid group with a vinyl polymer having an epoxy group, a method of reacting a vinyl polymer having an epoxy group with a vinyl monomer having acid group, a method of reacting a vinyl polymer having an acid group with a vinyl monomer having an isocyanate group, a method of reacting a vinyl polymer having an isocyanate group with a vinyl monomer having an acid group, a method of reacting a vinyl polymer having a hydroxyl group with a vinyl monomer having an isocyanate group, a method of reacting a vinyl polymer having an isocyanate group with a vinyl monomer having a hydroxyl group, a method of reacting a vinyl polymer having a hydroxyl group with a diisocyanate compound, obtaining a vinyl polymer having an isocyanate group, and reacting the vinyl polymer with a vinyl monomer having a hydroxyl group, and the like are exemplified, and any of these methods may be used for production.

The number average molecular weight of the macromonomer (a) can be adjusted by a polymerization initiator, a chain transfer agent, and the like.

As a production method of the macromonomer (a) having an additional reactive functional group such as a hydroxyl group, a isocyanate group, an epoxy group, a carboxylic group, an amino group, an amide group, a thiol group, and a carbodiimide group, for example, a method of copolymerizing a vinyl monomer having the functional group, a method using a chain transfer agent such as mercaptoethanol, mercaptoacetic acid, and mercaptopropionate, a method using an initiator capable of introducing a functional group such as 2,2'-azobis(propane-2-carboamidine), 4,4'-azobis(4-cyanovaleric acid), and 2,2'-azobis[N-(2-carboxyethyl)-2-methyl propion amidine], 2,2'-azobis [2 [1(2 hydroxyethyl)2 imidazoline 2 yl] propane], and the like are exemplified.

<Vinyl Monomer (b)>

The vinyl monomer (b) is a monomer which has an ethylenic unsaturated bond and is not a macromonomer. The vinyl monomer (b) is not particularly limited, and the same monomer as the monomer (a1) for obtaining the macromonomer (a) exemplified above can be used. Specifically, the monomer (x) and the monomer (y) are exemplified. However, in the vinyl monomer (b), as each of the monomer (x) and the monomer (y), a vinyl monomer is used. For both of the vinyl monomers, one kind may be used, or two or more kinds may be used in combination.

In a case where the macromonomer (a) does not include a constituent unit derived from the monomer (x), the vinyl monomer (b) preferably includes the monomer (x). In a case where the macromonomer (a) includes a constituent unit derived from the monomer (x), the vinyl monomer (b) may include the monomer (x), or may not include the monomer (x).

At least a part of the monomer (b) is preferably a (meth)acrylate monomer.

In a case where the macromonomer (a) is added to a polymer formed of a constituent unit derived from the vinyl monomer (b), it is appropriate for the vinyl monomer (b) to include a vinyl monomer having a functional group capable of reacting with a functional group of the macromonomer (a).

Composition of the vinyl monomer (b) is typically different from the composition of a monomer constituting the macromonomer (a). The composition shows the kind and the content proportion of the monomer.

From a viewpoint of adhesiveness, wet heat clouding resistance, and low corrosiveness, a part of the vinyl monomer (b) is preferably the monomer (x). That is, the vinyl monomer (b) preferably includes the monomer (x) and the monomer (y).

In the vinyl monomer (b), the monomer (y) is preferably ester (meth)acrylate (hereinafter, referred to as "monomer (y1)") having a non-substituted alkyl group having 4 to 30 carbon atoms.

With the monomer (y1), it is possible to express flexibility as an adhesive. In addition, since the monomer (y1) has hydrophobicity, it is possible to suppress an absorption rate or to reduce relative permittivity with the monomer (y1). In addition, in a case where the copolymer (A) is used in an adhesive resin composition including a polymerizable monofunctional compound, such as an adhesive resin composition (1) to be described later and the like, as the vinyl monomer (b) includes the monomer (y1), compatibility between the copolymer (A) and the polymerizable monofunctional compound is more excellent. That is, although details will be described later, as the polymerizable monofunctional compound, a polymerizable monofunctional compound having a hydrocarbon group having 4 or more carbon atoms is used in many cases. Since the monomer (y1) has an alkyl group having 4 to 30 carbon atoms, as the copolymer (A) includes a constituent unit derived from the monomer (y1), compatibility is high.

If compatibility between the copolymer (A) and the polymerizable monofunctional compound is high, transparency of the adhesive layer formed of an adhesive resin composition is also high, and the adhesive layer is useful for use that requires optical transparency such as OCA and LOCA.

Specific examples of the monomer (y1) include n-butyl (meth)acrylate, 2-ethyl hexyl (meth)acrylate, n-octyl (meth) acrylate, isooctyl (meth)acrylate, nonyl (meth)acrylate, isononyl (meth)acrylate, decyl (meth)acrylate, isodecyl (meth)acrylate, lauryl (meth)acrylate, hexadecyl (meth) acrylate, stearyl (meth)acrylate, isostearyl (meth)acrylate, behenyl (meth)acrylate, and the like.

The number of carbon atoms of an alkyl group that the monomer (y1) is 4 to 30, preferably 8 to 30, and particularly preferably 9 to 18.

The vinyl monomer (b) may further include vinyl monomers other than the monomer (x) and the monomer (y1). Other vinyl monomers can be appropriately selected from the monomer (y) exemplified above.

For example, from a viewpoint of high cohesion of an adhesive, as other vinyl monomers, one or more monomers selected from the group consisting of methyl (meth)acrylate and ethyl (meth)acrylate can be included.

In addition, preferable examples of other vinyl monomers include (meth)acrylate, hydroxy ethyl (meth)acrylate, hydroxy propyl (meth)acrylate, styrene, isobornyl (meth) acrylate, cyclohexyl (meth)acrylate, benzyl (meth)acrylate, tetrahydrofurfuryl (meth)acrylate, and the like.

The vinyl monomer (b) preferably has composition causing a difference in polarity between a polymer (hereinafter, referred to as "polymer (B)") obtained by polymerizing only the vinyl monomer (b) and the macromonomer (a). In a case where there is a difference in polarity between the polymer (B) and the macromonomer (a), when forming an adhesive layer or a coating film, a polymer chain of the macromonomer (a) and a polymer chain formed of the polymer (B) are microphase-separated, and properties of each of the polymer chains are easily sufficiently expressed. For example, effects of improving holding force of the adhesive layer due to the macromonomer (a) are sufficiently exhibited, and holding force of the adhesive layer is excellent.

For example, in a case where the macromonomer (a) includes a constituent unit derived from methyl methacrylate, the vinyl monomer (b) preferably includes the monomer (y1). Since the monomer (y1) has a lot of carbon atoms of an alkyl group, the monomer (y1) has low polarity compared to methyl methacrylate. By including the monomer (y1), a difference in polarity between the polymer (B) and the macromonomer (a) is caused.

In this case, a proportion of a constituent unit derived from methyl methacrylate with respect to a sum of all the constituent units constituting the macromonomer (a) is preferably equal to or more than 50% by mass, and more preferably equal to or more than 75% by mass. In addition, a proportion of the monomer (y1) with respect to a total mass of the vinyl monomer (b) is preferably equal to or more than 30% by mass, more preferably equal to or more than 60% by mass, further more preferably equal to or more than 80% by mass, and particularly preferably equal to or more than 90% by mass. As the proportion of the constituent unit derived from methyl methacrylate in the macromonomer (a) becomes great, or as the proportion of the monomer (y1) in the vinyl monomer (b) becomes great, a difference in polarity between the polymer (B) and the macromonomer (a) becomes great, and microphase separation becomes easy. Therefore, holding force of the adhesive layer is excellent, and adhesive deposits and the like are hardly caused.

The vinyl monomer (b) preferably has composition in which a glass transition temperature (TgB) of the polymer (B) obtained by polymerizing only the vinyl monomer (b) is −100° C. to 10° C. TgB is preferably −65° C. to 0° C., and more preferably −60° C. to −10° C. In a case where TgB is within the range, the adhesive resin composition including the copolymer (A) has appropriate flexibility and tackiness.

TgB is a glass transition temperature of homopolymer of the vinyl monomer in a case where the vinyl monomer (b) is one kind, and means a value calculated by Fox's calculation formula from a glass transition temperature and a mass fraction of each homopolymer of a plurality kinds of vinyl monomers in a case where the vinyl monomer (b) is a plurality of kinds.

The Fox's calculation formula is a calculation value obtained by the following formula, and can be obtained by using a value described in a polymer handbook [Polymer HandBook, J. Brandrup, Interscience, 1989] (Tg in the formula corresponds to TgB).

$$1/(273+Tg)=\Sigma(Wi/(273+Tgi))$$

(In the formula, Wi indicates a mass fraction of monomer i, and Tgi indicates a glass transition temperature (° C.) of a homopolymer of monomer i).

The Tga and the TgB preferably have a relationship of the following formula (3) from a viewpoint that each properties of a portion of the macromonomer (a) and a portion formed of a constituent unit derived from the vinyl monomer (b) can be sufficiently expressed). That is, Tga−TgB>0° C. is preferable.

$$Tga>TgB \quad (3)$$

Tga−TgB≥50° C. is more preferable, and Tga−TgB≥80° C. is most preferable.

<Content of Each Constituent Unit>

A content of the constituent units derived from the macromonomer (a) in the copolymer (A) is preferably 3% by mass to 60% by mass, more preferably 7% by mass to 40% by mass, further more preferably 8% by mass to 30% by mass, and particularly preferably 9% by mass to 20% by mass, with respect to a total mass of all the constituent units constituting the copolymer (A). In a case where the content of the constituent unit derived from the macromonomer (a) is equal to or more than a lower limit value of the range, holding force of the adhesive layer is more excellent. In a case where the content of the constituent units derived from the macromonomer (a) is equal to or less than an upper limit value of the range, compatibility with other components as being used as a mixture product for an adhesive, hot melt processability, and the like are more excellent.

A content of the constituent unit derived from the vinyl monomer (b) in the copolymer (A) is preferably 40% by mass to 97% by mass, more preferably 60% by mass to 93% by mass, further more preferably 70% by mass to 92% by mass, and particularly preferably 80% by mass to 91% by mass, with respect to the total mass of all the constituent units constituting the copolymer (A). In a case where the content of the constituent unit derived from vinyl monomer (b) is equal to or more than a lower limit value of the range, compatibility with other components as being used as a mixture product or hot melt processability is more excellent. In a case where the content of the constituent unit derived from the vinyl monomer (b) is equal to or less than an upper limit value of the range, holding force of the adhesive layer is more excellent.

A content of the constituent unit derived from the monomer (x) in the copolymer (A) is preferably 0.1% by mass to 30% by mass, more preferably 1.0% by mass to 20% by mass, further more preferably 2.0% by mass to 10.0% by mass, and particularly preferably 2.0% by mass to 4.8% by mass, with respect to the total mass of all the constituent units constituting the copolymer (A). Therefore, a content of the constituent unit derived from the monomer (y) is preferably 70% by mass to 99.9% by mass, more preferably 80% by mass to 99% by mass, further more preferably 90% by mass to 98% by mass, and particularly preferably 95.2% by mass to 98% by mass, with respect to the total mass of all the constituent units.

In a case where the content of the constituent unit derived from the monomer (x) is equal to or more than a lower limit value of the range (a content of the constituent unit derived from the monomer (y) is equal to or less than an upper limit value of the range), wet heat clouding resistance of the adhesive layer is more excellent. In a case where the content of the constituent unit derived from the monomer (x) is equal to or less than an upper limit value of the range (a content of the constituent unit derived from the monomer (y) is equal to or more than a lower limit value of the range), compatibility with other components as being used as a mixture product or hot melt processability is more excellent.

A content of the constituent unit derived from the monomer (x) in the constituent unit derived from the vinyl monomer (b) is preferably 0.1% by mass to 75% by mass, more preferably 1.0% by mass to 50% by mass, further more preferably 2.0% by mass to 25% by mass, and particularly preferably 2.0% by mass to 12% by mass, with respect to the total mass (100% by mass) of the constituent unit derived from the vinyl monomer (b). In a case where the content of the constituent unit derived from the monomer (x) is equal to or more than a lower limit value of the range, wet heat clouding resistance of the adhesive layer is more excellent. In a case where the content of the constituent unit derived from the monomer (x) is equal to or less than an upper limit value of the range, compatibility with other components as being used as a mixture product or hot melt processability is more excellent.

A content of a constituent unit derived from a carboxylic group-containing vinyl monomer in the copolymer (A) is preferably equal to or less than 0.5% by mass, and more preferably equal to or less than 0.1% by mass, with respect to the total mass of all the constituent units of the copolymer (A). The lower limit value is not particularly limited, and may be 0% by mass. In a case where the content of the constituent unit derived from a carboxylic group-containing vinyl monomer is equal to or less than the upper limit value, low corrosiveness is more excellent.

A content of a constituent unit derived from a hydroxyl group-containing vinyl monomer in the copolymer (A) is preferably equal to or less than 20% by mass, more preferably equal to or less than 10% by mass, and further more preferably equal to or less than 5% by mass, with respect to the total mass of all the constituent units constituting the copolymer (A). The lower limit is not particularly limited, and may be 0% by mass. In a case where the content of the constituent unit derived from a hydroxyl group-containing vinyl monomer is equal to or less than the upper limit value, compatibility with other components as being used as a mixture product, hot melt processability, or suppression of an increase in viscosity in a case of using the copolymer (A) as a desolvation agent is excellent.

<Properties of Copolymer (A)>

A weight average molecular weight (Mw) of the copolymer (A) is preferably 20,000 to 1,000,000, more preferably 50,000 to 700,000, further more preferably 80,000 to 500,000, even further more preferably 80,000 to 300,000, and particularly preferably 80,000 to 250,000. In a case where the weight average molecular weight of the copolymer (A) is equal to or more than a lower limit value of the range, there is a tendency that holding force of an adhesive layer using an adhesive resin composition including the copolymer (A) is favorable. In a case where the weight average molecular weight of the copolymer (A) is equal to or less than an upper limit value of the range, there is a tendency that coating properties of an adhesive resin composition or a coating composition including the copolymer (A) is favorable.

The weight average molecular weight of the copolymer (A) is measured by gel filtration chromatography (GPC), and is a value in terms of standard polystyrene. More specifically, the weight average molecular weight of the copolymer (A) is measured by a method described in examples to be described later.

An acid value of the copolymer (A) is preferably equal to or less than 3.9 mgKOH/g, and more preferably equal to or less than 0.8 mgKOH/g, from a viewpoint of low corrosiveness. The lower limit is not particularly limited, and may be 0 mgKOH/g.

The acid value is measured by a method of precisely adding 0.5 g of a sample to a beaker (A(g)), adding 50 mL of a toluene/95% ethanol solution and several droplets of phenolphthalein thereto, and titrating the resultant product with 0.5 M of a potassium hydroxide solution (titration amount=B (mL)) Titer of the potassium hydroxide solution=f is set, blank measurement is similarly performed (titration amount C (mL)), and calculation is performed by the following formula.

Acid value (mgKOH/g)={($B-C$)×0.2×56.11×$f$}/$A$/ solid content)

In a case where the acid value of the copolymer (A) is within the range, corrosion when an adhesive layer using an adhesive resin composition is laminated on a metal electrode and the like is hardly caused.

At a time at which the copolymer (A) is set as 50% by mass of an ethyl acetate solution, viscosity measured at 25° C. with a B-type viscometer (hereinafter, referred to as "solution viscosity") is preferably 10 to 800,000 mPa·s, more preferably 100 to 10,000 mPa·s, and further more preferably 100 to 7,000 mPa·s. In a case where the solution viscosity is equal to or more than a lower limit of the range, holding force of the adhesive layer becomes more excellent, and substrate staining properties becomes lower. In a case where the solution viscosity is equal to or less than an upper limit of the range, coating properties, compatibility with other components as being used as a mixture product, or hot melt processability is more excellent.

In a case where the radical polymerizable group that the copolymer (A) has is a group having an ethylenic unsaturated bond, an ethylenic unsaturated bond equivalent of the copolymer (A) is preferably 3,000 to 150,000 g/mol, more preferably 5,000 to 150,000 g/mol, and further more preferably 10,000 to 90,000 g/mol. In a case where the ethylenic unsaturated bond equivalent is equal to or more than a lower limit value of the range, adhesiveness of the adhesive layer using an adhesive resin composition including the copolymer (A) is more excellent. In a case where the ethylenic unsaturated bond equivalent is equal to or less than an upper limit value of the range, holding force of the adhesive layer using an adhesive resin composition including the copolymer (A) is more excellent.

The ethylenic unsaturated bond equivalent of the copolymer (A) means a mass of the copolymer (A) per 1 mol of an ethylenic unsaturated bond (carbon-carbon double bond).

The ethylenic unsaturated bond equivalent of the copolymer (A) is theoretically calculated by the following formula from a charge amount of a monomer used in production of the copolymer (A). The following formula shows a case where the monomer used in introduction of the ethylenic unsaturated bond has one ethylenic unsaturated bond.

Ethylenic unsaturated bond equivalent (g/mol)=(mass of all charged monomer (g)+mass of polymerization initiator (g))/amount of monomer used in introduction of ethylenic unsaturated bond (mol)

An amount of the monomer used in introduction of the ethylenic unsaturated bond is an amount of the monomer that can theoretically react with the copolymer (A) before introduction of the ethylenic unsaturated bond in the charge amount, and is an equivalent amount or less to that of a functional group capable of additional reaction that the copolymer (A) before introduction of the ethylenic unsaturated bond has. For example, in a case where the amount of the monomer used in introduction of the ethylenic unsaturated bond is an equivalent molar amount to that of a functional group capable of additional reaction that the copolymer (A) before introduction of the ethylenic unsaturated bond has, the amount of the monomer used in introduction of the ethylenic unsaturated bond in the calculation formula calculating the ethylenic unsaturated bond equivalent is an amount corresponding to an equivalent molar amount to that of a functional group capable of additional reaction that the copolymer (A) before introduction of the ethylenic unsaturated bond has. In a case where the amount of the monomer used in introduction of the ethylenic unsaturated bond is less than an equivalent molar amount to that of a functional group capable of additional reaction that the copolymer (A) before introduction of the ethylenic unsaturated bond has, the amount of the monomer used in introduction of the ethylenic unsaturated bond is an amount of the monomer used in introduction of the ethylenic unsaturated bond in the calculation formula calculating the ethylenic unsaturated bond equivalent.

The copolymer (A) may have a crosslinking structure, or may not have a crosslinking structure. From a viewpoint of coating properties, compatibility with other components as being used as a mixture product, or hot melt processability, of the copolymer (A), an adhesive resin composition including thereof, or the like, the copolymer (A) preferably does not have a crosslinking structure.

<Production Method of Copolymer (A)>

As a production method of the copolymer (A), for example, the following production methods (α), (β), and the like are exemplified. The copolymer (A) may be produced by the production method (α), or may be produced by the production method (β). However, the production method of the copolymer (A) is not limited thereto.

Production method (α): A method of copolymerizing the macromonomer (a) and the vinyl monomer (b) using a macromonomer having a radical polymerizable group as the macromonomer (a).

Production method (β): A method of reacting the macromonomer (a) and a polymer formed of a constituent unit derived from the vinyl monomer (b) including a vinyl monomer having a functional group capable of reacting with the additional reactive functional group, using a macromonomer having the additional reactive functional group as the macromonomer (a).

As the production method of the copolymer (A), the production method (α) is preferable. That is, the copolymer (A) is preferably a copolymerization product of the macromonomer (a) and the vinyl monomer (b). In the copolymerization product, a constituent unit derived from the macromonomer (a) and a constituent unit derived from the vinyl monomer (b) are randomly arranged. That is, a polymer chain derived from one or more macromonomers (a) binds to the entirety of the main chain of the copolymer (A). In such a polymerization product, there is a tendency that holding force of the adhesive layer is favorable, compared to a case) where a constituent unit derived from the macromonomer (a) binds only to an end of a polymer chain formed of a constituent unit derived from the vinyl monomer (b), for example.

(Production Method (α))

Composition of the monomer polymerized by the production method (α), that is, a preferable range of the kind of the polymerized monomer and the content (% by mass) (charge amount) of each monomer with respect to a total mass of all monomers are the same as the composition of the copolymer (A), that is, the kind of the constituent unit derived from the monomer constituting the copolymer (A) and the content (% by mass) of each constituent unit with respect to a total mass of all constituent units.

For example, the content of the macromonomer (a) with respect to the total mass (100% by mass) of all polymerized monomers is preferably 3% by mass to 60% by mass, more preferably 7% by mass to 40% by mass, further more preferably 8% by mass to 30% by mass, and particularly preferably 9% by mass to 20% by mass.

Polymerization of the monomer may be performed by a known method using a known polymerization initiator. For example, a method of reacting the macromonomer (a) and the vinyl monomer (b) at a reaction temperature of 60° C. to 120° C. in the presence of a radical polymerization initiator for 1 to 14 hours is exemplified. At the time of polymerization, a chain transfer agent may be used depending on the necessity.

As the polymerization method, for example, a known polymerization method such as a solution polymerization method, a suspension polymerization method, a bulk polymerization method, and an emulsion polymerization method can be applied. From a viewpoint of dryness in a film forming step and coating performance, water is preferably included in the adhesive resin composition including the copolymer (A). A moisture content of the adhesive resin composition is preferably equal to or less than 10% by mass, more preferably equal to or less than 5% by mass, and most preferably equal to or less than 1% by mass. The moisture content of the adhesive resin composition can be measured by a capacitance method Karl Fischer method. In addition, in order to reduce the moisture content of the adhesive resin composition, water is preferably included in a production step of the copolymer (A). The moisture content in the production step of the copolymer (A) is preferably equal to or less than 10% by mass, more preferably equal to or less than 5% by mass, and most preferably equal to or less than 1% by mass, and the moisture content may be 0% by mass. As a production method not including water in the production method of the copolymer (A), a solution polymerization method is preferable.

Solution polymerization can be, for example, performed by supplying a polymerization solvent, a monomer, and a radical polymerization initiator in a polymerization container and maintaining thereof at a predetermined reaction temperature. The entire amount of the monomer may be charged in the polymerization container in advance (before setting the inside of the polymerization container at a predetermined reaction temperature), or may be supplied in droplets after setting the inside of the polymerization container at a predetermined reaction temperature. Or a part of the monomer may be charged in the polymerization container in advance, and the remainder may be supplied in droplets.

Since the copolymer (A) has a constituent unit derived from the macromonomer (a) and a constituent unit derived from the vinyl monomer (b), and at least a part of the constituent unit that the macromonomer (a) has and the constituent unit derived from the vinyl monomer (b) has an amide bond, it is possible to form an adhesive layer excellent in wet heat clouding resistance and low corrosiveness. In addition, the adhesive layer is sufficiently excellent in adhesiveness.

A (meth)acrylic copolymer for adhesive resin composition in the related art includes a constituent unit having a carboxylic group in many cases. By including a carboxylic group, cohesion of the copolymer is high and adhesiveness or holding force of the adhesive layer is high. In addition, since the carboxylic group is a hydrophilic group, affinity to a copolymer and to moisture is high, and when exposed to a high temperature and high humidity atmosphere, clouding due to cohesion of moisture in the adhesive layer is hardly caused. However, the carboxylic group is acidic, and thus becomes a cause corrosion.

Since the copolymer (A) has an amide bond, the copolymer (A) has sufficiently high affinity to moisture even though a carboxylic group is not included, and clouding is suppressed. In addition, as a part of the constituent unit is introduced into a copolymer as the macromonomer (a), sufficiently high cohesion is obtained even though a carboxylic group is not included, excellent adhesion or holding force is obtained, and clouding is hardly caused.

In particular, as a constituent unit not having an amide bond is included along with a constituent unit having an amide bond, more excellent adhesion or holding force is easily obtained.

Therefore, in the copolymer (A), it is possible to reduce a content of the carboxylic group to obtain low corrosiveness while sufficiently maintaining wet heat clouding resistance, adhesiveness, and holding force. In addition, in the copolymer (A), holding force of the adhesive layer is more excellent compared to a copolymerization product obtained by copolymerizing a monomer constituting the macromonomer (a) and the vinyl monomer (b) at a same composition ratio.

The reason why the above effect is obtained by using the macromonomer (a) is considered that when forming an adhesive layer, a polymer chain derived from the macromonomer (a) and a polymer chain formed of a constituent unit derived from the vinyl monomer (b) are microphase-separated to form a sea-island structure, and properties of each of the polymer chains are sufficiently expressed.

In this manner, an adhesive layer using an adhesive resin composition including the copolymer (A) is excellent in wet heat clouding resistance, even when exposed to a high humidity and high temperature environment, transparency can be sufficiently maintained, and can be used for use requiring transparency, such as lamination of a display surface of a display device and a transparent substrate. In addition, the adhesive layer has low corrosiveness, and thus can be used for direct use in a member in which there is a concern for corrosion, for example, an electrode formed of metal or a metal oxide (ITO and the like), and the like. In addition, since the adhesive layer is excellent in holding force, after laminating members via the adhesive layer, defects such as position deviation of the laminated members and the like are hardly caused.

Since the above effect is exhibited, the copolymer (A) is useful as an adhesive resin composition, and particularly preferably used in an adhesive sheet.

However, use of the adhesive resin composition including the copolymer (A) is not limited to the above, and the adhesive resin composition including the copolymer (A) can be used for other uses. As the other uses, for example, a coating composition, an adhesive composition, a forming material composition, a film composition, and the like are exemplified.

As the production method of the copolymer (A) of other embodiments, a method of chemically binding a radical polymerizable group to the above-described polymer is typically used.

For example, the copolymer (A) is obtained by a method of reacting the following copolymer (A0) and the following compound (m0).

Copolymer (A0): A (meth)acrylic copolymer having constituent units derived from the macromonomer (a) and the vinyl monomer (b) and having a first functional group.

Compound (m0): A compound having a second functional group capable of reacting with the first functional group and a radical polymerizable group.

In the method, the first functional group of the copolymer (A0) and the second functional group of the compound (m0) are reacted with each other, and the radical polymerizable group is introduced into a part of the first functional group to obtain the copolymer (A). In a case where the copolymer (A0) has a constituent unit having the first functional group, the copolymer (A) having a constituent unit having the radical polymerizable group is obtained by the reaction. In a case where the copolymer (A0) has the first functional group in a main chain end, the copolymer (A) having the radical polymerizable group in a main chain end is obtained by the reaction.

As the first functional group, an additional reactive functional group such as a hydroxyl group, an isocyanate group, an epoxy group, a carboxylic group, an acid anhydride group, an amino group, an amide group, a thiol group, and a carbodiimide group are preferable. As the functional group capable of reacting with the additional reactive functional group, the same ones as those exemplified in the description of the macromonomer (a) are exemplified.

The copolymer (A0) is the same as the copolymer (A), except that the copolymer (A0) has the first functional group instead of the radical polymerizable group. The compound (m0) can be appropriately selected from various monomers exemplified as the above-described monomer (a1), for example, depending on the first functional group that the copolymer (A0) has.

The copolymer (A0) can be produced by the following production method ($\alpha$) or ($\beta$), for example. The copolymer (A0) may be produced by the production method ($\alpha$), or may be produced by the production method ($\beta$). However, the production method of the copolymer (A0) is not limited thereto.

Production method ($\alpha$): A method of copolymerizing the macromonomer (a) and the vinyl monomer (b) using a macromonomer having a radical polymerizable group as the macromonomer (a).

Production method ($\beta$): A method of reacting the macromonomer (a) and a polymer formed of a constituent unit derived from the vinyl monomer (b) including a vinyl monomer having a functional group capable of reacting with the additional reactive functional group, using a macromonomer having the additional reactive functional group as the macromonomer (a).

At least one of the monomer constituting the macromonomer (a) and the vinyl monomer (h) preferably includes a monomer having a first functional group.

As the production method of the copolymer (A0), the production method ($\alpha$) is preferable. That is, the copolymer (A0) is preferably a copolymerization product of the macromonomer (a) and the vinyl monomer (b). In the copolymerization product, a constituent unit derived from the macromonomer (a) and a constituent unit derived from the vinyl monomer (b) are randomly arranged. That is, a polymer chain derived from one or more macromonomers (a) binds to the entirety of the main chain of the copolymer (A). In such a polymerization product, there is a tendency that holding force of the adhesive layer is favorable, compared to a case where a constituent unit derived from the macromonomer (a) binds only to an end of a polymer chain formed of a constituent unit derived from the vinyl monomer (b), for example.

Composition of the monomer polymerized by the production method ($\alpha$), that is, a preferable range of the kind of the polymerized monomer and the content (% by mass) (charge amount) of each monomer with respect to a total mass of all monomers are the same as the composition of the copolymer (A0), that is, the kind of the constituent unit derived from the monomer constituting the copolymer (A0) and the content (% by mass) of each constituent unit with respect to a total mass of all constituent units.

For example, the content of the macromonomer (a) with respect to the total mass (100% by mass) of all the polymerized monomers is preferably 3% by mass to 60% by mass, more preferably 7% by mass to 40% by mass, and particularly preferably 7% by mass to 20% by mass.

Polymerization of the monomer may be performed by a known method using a known polymerization initiator. For example, a method of reacting the macromonomer (a) and the vinyl monomer (b) at a reaction temperature of 60° C. to 120° C. in the presence of a radical polymerization initiator for 1 to 14 hours is exemplified. At the time of polymerization, a chain transfer agent may be used depending on the necessity.

As the polymerization method, for example, a known polymerization method such as a solution polymerization method, a suspension polymerization method, a bulk polymerization method, and an emulsion polymerization method can be applied. From a viewpoint of dryness in a film forming step and coating performance, water is preferably included in the adhesive resin composition including the copolymer (A). A moisture content of the adhesive resin composition is preferably equal to or less than 10% by mass, more preferably equal to or less than 5% by mass, and most preferably equal to or less than 1% by mass. The moisture content of the adhesive resin composition can be measured by a capacitance method Karl Fischer method. In addition, in order to reduce the moisture content of the adhesive resin composition, water is preferably included in a production step of the copolymer (A). The moisture content in the production step of the copolymer (A) is preferably equal to or less than 10% by mass, more preferably equal to or less than 5% by mass, and most preferably equal to or less than 1% by mass, and the moisture content may be 0% by mass. As a production method not including water in the production method of the copolymer (A), a solution polymerization method is preferable.

Solution polymerization can be, for example, performed by supplying a polymerization solvent, a monomer, and a radical polymerization initiator in a polymerization container and maintaining thereof at a predetermined reaction temperature. The entire amount of the monomer may be charged in the polymerization container in advance (before setting the inside of the polymerization container at a predetermined reaction temperature), or may be supplied in droplets after setting the inside of the polymerization container at a predetermined reaction temperature. Or a part of the monomer may be charged in the polymerization container in advance, and the remainder may be supplied in droplets.

Reaction between the copolymer (A0) and the compound (m0) varies depending on combination of the first functional group and the second functional group, for example, but can be performed in the condition of adding the compound (m0) to a copolymer (A0) solution by solution polymerization, performing heating at an appropriate temperature within a range of room temperature to 250° C. for 1 to 24 hours and the like. Reaction between the copolymer (A0) and the compound (m0) may be performed by using a catalyst for facilitating progress of reaction or a polymerization inhibitor for preventing radical polymerization of the radical polymerizable group in additional reaction, or may be performed by setting a sanitation period for sufficient progress of reaction.

A use amount of the compound (m0) is preferably a 0.5 equivalent amount to 10 times the amount, more preferably equivalent to 5 times the amount, and further more preferably equivalent to 2 times the amount, with respect to a molar number of the first functional group of the copolymer (A0).

Since the copolymer (A) has a constituent unit derived from the macromonomer (a) and a constituent unit derived from the vinyl monomer (b), and has a radical polymerizable group, it is possible to form an adhesive layer excellent in holding force. Since holding force is excellent, after members are laminated via the adhesive layer, defects such as position deviation, or floating or exfoliation under a high temperature and high humidity environment, of the laminated members, extrusion of the adhesive layer, adhesive deposits when the members are exfoliated are hardly caused. In addition, the adhesive layer is sufficiently excellent in adhesiveness as well.

The reason why the above effect is obtained is considered that since the macromonomer (a) is used, when forming an adhesive layer, a polymer chain derived from the macromonomer (a) and a polymer chain formed of a constituent unit derived from the vinyl monomer (b) are microphase-separated to form a sea-island structure, and properties of each of the polymer chains are sufficiently expressed, and that since a radical polymerizable group is included, a high crosslinking density is obtained when crosslinking the adhesive layer.

Since the above effect is exhibited, the copolymer (A) is useful as an adhesive resin composition, and particularly preferably used in an adhesive sheet.

However, use of the adhesive resin composition including the copolymer (A) is not limited to the above, and the adhesive resin composition including the copolymer (A) can be used for other uses. As the other uses, for example, a coating composition, an adhesive composition, a forming material composition, a film composition, and the like are exemplified.

<Adhesive Resin Composition>

The adhesive resin composition of the present invention includes the copolymer (A).

The copolymer (A) included in the adhesive resin composition may be one kind, or may be two or more kinds.

The adhesive resin composition of the present invention may be formed of a (meth)acrylic copolymer (A) alone, or may include other components depending on the necessity.

<Polymerizable Monofunctional Compound>

The adhesive resin composition of the present invention can further include a polymerizable monofunctional compound including one radical polymerizable group, depending on the necessity.

As the radical polymerizable group in the polymerizable monofunctional compound, the same ones as above are exemplified, and a (meth)acryloyl group is preferable. That is, the polymerizable monofunctional compound is preferably a monofunctional (meth)acrylate having one (meth)acryloyl group.

As the polymerizable monofunctional compound, the same ones as the monomer for obtaining the macromonomer (a) exemplified above can be used.

As the polymerizable monofunctional compound, from a viewpoint of flexibility and the like as an adhesive, a polymerizable monofunctional compound having a hydrocarbon group having 4 or more carbon atoms is preferable. As the hydrocarbon group, an alkyl group, an aryl group, an aralkyl group, and the like are exemplified. The number of carbon atoms of the hydrocarbon group is more preferably 8 to 30.

In a case where a liquid adhesive resin composition is set as the adhesive resin composition of the present invention, as the polymerizable monofunctional compound, a compound functioning as a reactive diluent is preferable. As the polymerizable monofunctional compound functioning as a reactive diluent, a liquid polymerizable monofunctional compound at 25° C. is typically used. As the polymerizable monofunctional compound capable of using the same as the monomer for obtaining the macromonomer (a) as such a polymerizable monofunctional compound, any one kind may be used alone, or two or more kinds may be used in combination.

As the polymerizable monofunctional compound, at least one selected from the group consisting of isodecyl (meth) acrylate, isostearyl (meth)acrylate, ethyl hexyl (meth)acrylate, n-butyl (meth)acrylate, isobutyl (meth)acrylate, isononyl (meth)acrylate, n-octyl (meth)acrylate, isooctyl (meth)acrylate, and lauryl acrylate is particularly preferable.

<Oligomer Component>

The adhesive resin composition of the present invention can further include an oligomer component, depending on the necessity.

As the oligomer component, urethane-based oligomer, polyester-based oligomer, acryl-based oligomer, polyether-based oligomer, polyolefin-based oligomer, and the like are exemplified. These may have a reactive double bond, or may have a functional group and react with other components in the adhesive resin composition, or may not react with other components.

<Crosslinking Agent>

The adhesive resin composition of the present invention can further include a crosslinking agent, depending on the necessity.

In a case where the adhesive resin composition includes a crosslinking agent, it is possible to cure the adhesive resin composition (crosslink) and heighten a crosslinking density of the adhesive layer. With this, there is a tendency that intensity, holding force, and the like of the adhesive layer are more excellent. Depending on the use, it is not required to include a crosslinking agent. In addition, in a case where the copolymer (A) has self-crosslinking properties, for example, in a case where the copolymer (A) has both of a hydroxyl group and an isocyanate group, it is possible to obtain sufficient intensity, holding force, and the like even if a crosslinking agent is not included.

As the crosslinking agent, for example, an isocyanate-based crosslinking agent, an epoxy-based crosslinking agent, a metal chelate-based crosslinking agent, a photocuring-based crosslinking agent, a melamine-based crosslinking agent, an aziridine-based crosslinking agent, and the like are exemplified. Any one kind of these crosslinking agents may be used alone, or two or more kinds thereof may be used in combination.

As the isocyanate-based crosslinking agent, for example, aromatic polyisocyanate such as xylene diisocyanate, diphenylmethane diisocyanate, triphenylmethane triisocyanate, and tolylene diisocyanate, aliphatic or alicyclic polyisocyanate such as hexamethylene diisocyanate, isophorone diisocyanate, and a hydrogen additive of the aromatic polyisocyanate, a dimer or trimer of the polyisocyanate, an adduct body formed of the polyisocyanate and polyol such as trimethylolpropane, and the like are exemplified. Any one kind of these may be used alone, or two or more kinds thereof may be used in combination.

As the epoxy-based crosslinking agent, for example, ethylene glycol diglycidyl ether, polyethylene glycol diglycidyl ether, 1,6-hexandiol diglycidyl ether, bisphenol A epoxy resin, N,N,N'N'-tetraglycidyl-m-xylene diamine, 1,3-bis(N,N-diglycidyl amino methyl)cyclohexane, N,N-diglycidylaniline, N,N-diglycidyl toluidine, and the like are exemplified.

As the metal chelate-based crosslinking agent, a compound in which polyvalent metal is covalently bonded or coordinately bonded with an organic compound is exemplified. As the polyvalent metal, for example, aluminum, nickel, chrome, copper, iron, tin, titanium, zinc, cobalt, manganese, zirconium, and the like are exemplified. As the organic compound, for example, an organic compound having an oxygen atom, such as a ketone compound such as acethyl acetone, alkyl ester, an alcohol compound, a carboxylic acid compound, and an ether compound, is exemplified.

The photocuring-based crosslinking agent is a compound which performs crosslinking reaction by an action of a photopolymerization initiator and the like, when an active energy ray such as ultraviolet ray is emitted.

As the kind of crosslinking agent, for example, a polymerizable multifunctional compound having two or more radical polymerizable groups; a polyfunctional organic resin having two or more functional groups selected from the group consisting of an isocyanate group, an epoxy group, a melamine group, a glycol group, a siloxane group, and an amino group; an organic metal compound having a metal complex, and the like are exemplified. As the metal in the metal complex, zinc, aluminum, sodium, zirconium, calcium, and the like are exemplified.

As the radical polymerizable group in the polymerizable multifunctional compound, the same ones as described above are exemplified, and a (meth)acryloyl group is preferable. That is, the polymerizable polyfunctional compound is preferably a functional (meth)acrylate having two or more (meth)acryloyl groups.

As the polyfunctional (meth)acrylate, for example, triethylene glycol diacrylate, polyalkylene glycol diacrylate, bisphenol A-EO/PO-modified diacrylate, alkoxyated hexanediol diacrylate, polyisobutylene diacrylate, alkoxylated triemthyloyl propane triacrylate, pentaerythritol triacrylate, alkoxylated pentaerythritol triacrylate, alkoxylated pentaerythritol tetraacrylate, alkoxylated pentaerythritol pentaacrylate, caprolactone-modified dipentaerithritol pentaacrylate, caprolactone-modified dipentaerithritol hexaacrylate, and the like are exemplified. Any one kind of these polyfunctional (meth)acrylate may be used alone, or two or more kinds thereof may be used in combination.

<Reaction Initiator>

The adhesive resin composition of the present invention can further include a reaction initiator depending on the necessity.

The reaction initiator is a compound which generates radicals by emission or heating of an active energy ray (ultraviolet ray and the like). By including a reaction initiator, it is possible to cure (crosslink) the adhesive resin composition by emission or heating of an active energy ray (ultraviolet ray and the like).

As the reaction initiator, for example, a photopolymerization initiator, a heat polymerization initiator, and the like are exemplified.

As the photopolymerization initiator, a compound which is decomposed and generates radicals by emission of an active energy ray, or a compound which extracts hydrogen derived from a constituent unit in a mixture product and generates radicals by emission of an active energy ray, and the like are exemplified.

The photopolymerization initiator is not particularly limited, and a known photopolymerization initiator can be appropriately used. For example, benzophenone, 2-methyl benzophenone, 4-methyl benzophenone, 2,2-dimetoxy-1,2-diphenyl ethane-1-one, 1-hydroxy-cyclohexyl phenyl ketone, 2-hydroxy-2-methyl-1-phenyl-propane-1-one, 1-[4-(2-hydroxy ethoxy)-phenyl]-2-hydroxy-2-methyl-1-propane-1-one, 2-hydroxy-1-[4-[4-(2-hydroxy-2-methyl-propionyl)-benzyl] phenyl]-2-methyl-propane-1-one, 2-methyl-1-(4-methyl thiophenyl)-2-morpholnopropane-1-one, 2-(dimethylamino)-2-[4-methylphenyl)methyl]-1-[4-(4-morpholnyl)phenyl]-1-butanone, 2,4,6-trimethyl benzoyl-diphenyl phosphine oxide, bis(2,4,6-trimethylbenzoyl)phenyl phosphine oxide, bis(η5-2,4-cyclopentadiene-1-yl)-bis (2,6-difluoro-3-(H-pyro-1-yl)-phenyl)titanium, 1,2-octanediol 1-[4-(phenylthio)-2-(o-benzoyloxime)], ethenone 1-[9-ethyl-6-(2-methyl benzoyl)-9H-carbazol-3-yl]-1-(o-acethyloxime), and the like are exemplified. Any one kind of these photopolymerization initiators may be used alone, or two or more kinds thereof may be used in combination.

The heat polymerization initiator is not particularly limited, and a known heat polymerization initiator can be appropriately used. For example, an azo compound such as 2,2'-azobisisobutyronitrile, 2,2'-azobis(2-methylbutyronitrile), 2,2'-azobis(2,4-dimethylvaleronitrile), dimethyl 2,2'-azobisisobutyrate, 2,2'-azobis(2-methylpropion amidine) dihydrochloride; an organic peroxide such as cumylperoxy neodecanoate, 1,1,3,3-tetramethylbutylperoxy neodecanoate, t-hexylperoxy neodecanoate, t-butylperoxy neodecanoate, t-hexylperoxy pivalate, t-butylperoxy pivalate, 1,1,3,3-tetramethylbutylperoxy 2-ethylhexanoate, 2,5-dimethyl-2,5-bis(2-ethylhexanoylperoxy)hexane, t-hexylperoxy 2-ethylhesanoate, t-butyperoxy 2-ethylhexanoate, t-butylperoxy isobutylate, t-hexylperoxy isopropyl monocarbonate, t-butylperoxy-3,5,5-trimethylhexanoate, t-butylperoxy laurate, t-butylperoxy isopropyl monocarbonate, t-butylperoxy 2-ethylhexyl monocarbonate, t-hexylperoxy benzoate, 2,5-dimethyl-2,5-bis(2-benzoylperoxy)hexane, t-butylperoxy benzoate, lauroylperoxide, stearoylperoxide, benzoylperoxide, bis(4-t-butylcyclohexyl)peroxydicarbonate, diisopropyl benzene hydroperoxide, cumene hydroperoxide, t-hexyl hydroperoxide, and t-butyl hydroperoxide; an inorganic peroxide such as hydrogen peroxide, potassium persulfate, sodium persulfate, and ammonium persulfate, and the like are exemplified. Any one kind of these heat polymerization initiators may be used alone, or two or more kinds thereof may be used in combination.

<Filler>

The adhesive resin composition of the present invention can further include a filler depending on the necessity.

The filler is, for example, used for imparting heat resistance, thermal conductivity, flame retardant properties, electric conductivity, and the like. As the filler, for example, an inorganic filler such as metal-based powder such as zinc oxide powder and titanium oxide powder, carbon black such as acetylene black, talc, glass powder, silica powder, conductive particle, and glass powder; an organic filler such as polyethylene powder, polyester powder, polyamide powder, fluororesin powder, polyvinyl chloride powder, epoxy resin powder, and silicone resin powder; and the like are exemplified. Any one kind of these fillers may be used alone, or two or more kinds thereof may be used in combination.

<Organic Solvent>

The adhesive resin composition of the present invention can include an organic solvent for improving coating suitability, film-forming properties, and the like, depending on the necessity.

The organic solvent is not particularly limited as long as the organic solvent can dissolve the copolymer (A), and for example, a hydrocarbon-based solvent such as heptane, cyclohexane, toluene, xylene, octane, and mineral spirit; an ester-based solvent such as ethyl acetate, n-butyl acetate, isobutyl acetate, ethylene glycol monomethyl ether acetate, and diethylene glycol monobutyl ether acetate; a ketone-based solvent such as methyl ethyl ketone, methyl isobutyl ketone, diisobutyl ketone, and cyclohexane; an alcohol-based solvent such as methanol, ethanol, isopropanol, n-butanol, s-butanol, and isobutanol; an ether-based solvent such as dioxane, ethylene glycol monoethyl ether, ethylene glycol monobutyl ether, and propylene glycol monopropylether; an aromatic petroleum-based solvent such as Swazole 310, Swazole 1000, Swazole 1500 which are manufactured by Cosmo Oil Co., Ltd., and the like are exemplified. Any one kind of these organic solvents may be used alone, or two or more kinds thereof may be used in combination.

In a case where the adhesive resin composition is an active energy ray curable adhesive resin composition, the adhesive resin composition does not preferably substantially include an organic solvent. Substantially not including an organic solvent indicates that a content of the organic solvent is equal to or less than 1% with respect to a total mass of the adhesive resin composition. The content of the organic solvent may be 0% by mass. The content of the organic solvent can be measured by gas chromatography.

<Other Additives>

The adhesive resin composition of the present invention can appropriately include various additives such as a reaction catalyst, an adhesiveness imparting resin, an anti-oxidant, a photostabilizer, a metal-inactivating agent, an anti-aging agent, a moisture absorbent, a rust preventive, a hydrolysis inhibitor, and the like.

As the reaction catalyst, for example, a tertiary amine-based compound, a quaternary ammonium-based compound, a tin laurylate compound, and the like are exemplified.

As the anti-oxidant, for example, a phenol-based anti-oxidant, a phosphorus-based anti-oxidant, a hydroxyl amine-based anti-oxidant, a sulfur-based anti-oxidant, and the like are exemplified. Among these, from a viewpoint that discoloration of a resin after heating is small, a phenol-based anti-oxidant and a phosphorus-based anti-oxidant are preferable. These may be used alone, or several kinds thereof may be used in combination. A content of the anti-oxidant is preferably 0.1 to 5 parts by mass with respect to 100 parts by mass of the copolymer (A).

The adhesive resin composition of the present invention can be produced by producing the above-described copolymer (A) and mixing other components (polymerizable monofunctional compound, crosslinking agent, photopolymerization initiator, and the like) with the obtained copolymer (A), depending on the necessity, for example Composition of the adhesive resin composition can be appropriately set depending on the use, the form of use, and the like of the adhesive resin composition.

Preferable Embodiment

As a preferable embodiment of the adhesive resin composition of the present invention, the following adhesive resin compositions (1) to (3) and the like are exemplified.

(Adhesive Resin Composition (1))

An adhesive resin composition (1) is a liquid adhesive resin composition at least including the copolymer (A), a polymerizable monofunctional compound having one radical polymerizable group, a polymerizable polyfunctional compound having two or more radical polymerizable groups, and a photopolymerization initiator.

The adhesive resin composition (1) is an active energy ray curable type adhesive resin composition.

"Liquid" indicates a state of liquid at 25° C. A viscosity of the liquid adhesive resin composition (1) measured at 25° C. by a B-type viscometer is preferably 1,000 to 80,000 mPa·s.

The adhesive resin composition (1) does not preferably substantially include an organic solvent.

The adhesive resin composition (1) may further include a filler, an oligomer component, other additives, and the like.

The adhesive resin composition (1) can be used as LOCA, for example.

A content of the copolymer (A) in the adhesive resin composition (1) is preferably 10% by mass to 80% by mass, and more preferably 15% by mass to 70% by mass with respect to a total mass (100% by mass) of the copolymer (A) and the polymerizable monofunctional compound.

A content of the polymerizable polyfunctional compound in the adhesive resin composition (1) is preferably 0.1 to 50 parts by mass, and more preferably 0.5 to 20 parts by mass with respect to a total 100 parts by mass of the copolymer (A) and the polymerizable monofunctional compound.

A content of a photopolymerization initiator in the adhesive resin composition (1) is preferably 0.1 to 10 parts by mass, and more preferably 0.5 to 5 parts by mass with respect to a total 100 parts by mass of the copolymer (A), the polymerizable monofunctional compound, and the polymerizable polyfunctional compound.

(Adhesive Resin Composition (2))

An adhesive resin composition (2) is a hot melt type adhesive resin composition including the copolymer (A).

The adhesive resin composition (2) is in a solid state at 25° C.

The adhesive resin composition (2) does not substantially include an organic solvent.

The adhesive resin composition (2) may further include a polymerizable monofunctional compound, a crosslinking agent, a reaction initiator, a filler, an oligomer component, other additives, and the like, depending on the necessity.

The adhesive resin composition (2) preferably includes a crosslinking agent. With this, it is possible to cure (crosslink) an adhesive layer or adhesive sheet formed of the adhesive resin composition (2).

The adhesive resin composition (2) is preferably a polymerizable polyfunctional compound having two or more radical polymerizable groups as a crosslinking agent, and an active energy ray curable type adhesive resin composition including a photopolymerization initiator as a reaction initiator.

The adhesive resin composition (2) can be formed into a transparent double-sided adhesive sheet form, crosslinked depending on the necessity, and used as OCA, for example.

A content of the copolymer (A) in the adhesive resin composition (2) is preferably equal to or more than 70% by mass, more preferably equal to or more than 80% by mass, and may be 100% by mass with respect to a total mass of the adhesive resin composition.

In a case where the adhesive resin composition (2) is a crosslinking agent, a content of the crosslinking agent in the adhesive resin composition (2) can be appropriately set depending on the kind of the crosslinking agent. For example, in a case where the crosslinking agent is the polymerizable polyfunctional compound, a content of the polymerizable polyfunctional compound is preferably 1 to 20 parts by mass, and more preferably 3 to 10 parts by mass with respect to 100 parts by mass of the copolymer (A).

In a case where the adhesive resin composition (2) is a photopolymerization initiator, a content of the photopolymerization initiator is preferably 0.1 to 10 parts by mass, and more preferably 0.5 to 5 parts by mass with respect to a total 100 parts by mass of the copolymer (A), the polymerizable monofunctional compound, and the polymerizable polyfunctional compound.

(Adhesive Resin Composition (3))

An adhesive resin composition (3) is a liquid adhesive resin composition including the copolymer (A) and the organic solvent.

A viscosity of the liquid adhesive resin composition (3) measured at 25° C. by a B-type viscometer is preferably 100 to 80,000 mPa·s.

The adhesive resin composition (3) may further include a polymerizable monofunctional compound, a crosslinking agent, a reaction initiator, a filler, an oligomer component, other additives, and the like, depending on the necessity.

The adhesive resin composition (3) preferably includes a crosslinking agent. With this, a crosslinking density at the time of curing (crosslinking) an adhesive layer or an adhesive sheet formed of the adhesive resin composition (3) becomes higher.

The adhesive resin composition (3) is preferably a polymerizable polyfunctional compound having two or more radical polymerizable groups as a crosslinking agent, an active energy ray curable type composition including the photopolymerization initiator as a reaction initiator, or a thermocurable type composition including a compound reacting with a functional group included in the copolymer (A) by heat.

The adhesive resin composition (3) is formed into a transparent double-sided adhesive sheet form by coating the adhesive resin composition (3) on an exfoliative substrate, drying thereof, and the like, crosslinked by heating or ultraviolet ray emission, depending on the necessity, and used as an adhesive.

A content of the copolymer (A) in the adhesive resin composition (3) is preferably equal to more than 70% by mass, more preferably equal to or more than 80% by mass, and may be 100% by mass with respect to a solid content of the adhesive resin composition.

The solid content of the adhesive resin composition is a remainder obtained by excluding an organic solvent from the adhesive resin composition (3).

A solid content concentration of the adhesive resin composition can be appropriately set considering a viscosity of the adhesive resin composition and the like, and can be 10% by mass to 90% by mass, for example.

In a case where the adhesive resin composition (3) is a crosslinking agent, a content of the crosslinking agent in the adhesive resin composition (3) can be appropriately set depending on the kind of the crosslinking agent. For example, in a case where the crosslinking agent is the polymerizable polyfunctional compound, a content of the polymerizable polyfunctional compound is preferably 0.1 to 20 parts by mass, and more preferably 0.5 to 10 parts by mass with respect to 100 parts by mass of the copolymer (A).

In a case where the crosslinking agent is the thermocurable type, as the crosslinking agent, for example, a thermo-curable type crosslinking agent such as an isocyanate-based crosslinking agent, an epoxy-based crosslinking agent, a metal chelate-based crosslinking agent, a photocuring-based crosslinking agent, a melamine-based crosslinking agent, an aziridine-based crosslinking agent, and the like are exemplified. Specific examples of the isocyanate-based crosslinking agent, the epoxy-based crosslinking agent, and the metal chelate-based crosslinking agent include the same as described above. One kind of these crosslinking agents may be used alone, or two or more kinds thereof may be used in combination.

In a case where the crosslinking agent is the thermocurable type crosslinking agent, a content of the thermocurable type crosslinking agent is preferably 0.01 to 10 parts by mass, and more preferably 0.1 to 3 parts by mass with respect to 100 parts by mass of the copolymer (A).

In a case where the adhesive resin composition (3) includes a photopolymerization initiator, a content of the photopolymerization initiator is preferably 0.1 to 10 parts by mass, and more preferably 0.5 to 5 parts by mass with respect to a total 100 parts by mass of the copolymer (A), the polymerizable monofunctional compound, and the polymerizable polyfunctional compound.

<Use>

The adhesive resin composition of the present invention can be used in lamination of members.

When performing lamination, as the adhesive resin composition, an adhesive resin composition obtained by being formed into a sheet form in advance or coated, and set as an adhesive sheet may be disposed between members, or an adhesive resin composition not formed into a sheet form may be disposed directly, or between members.

The adhesive sheet will be described in detail later.

The member laminated using the adhesive resin composition of the present invention is not particularly limited. For example, the member can be used in lamination of a window lamination film for automobiles, construction, and the like, lamination of a label in label display, and the like.

In a case where the adhesive resin composition is transparent, the adhesive resin composition can be processed into a transparent double-sided adhesive sheet form, and as OCA, used in lamination of various panels in display of a liquid crystal panel and the like, lamination of a transparent plate material such as glass, and the like. In a case where the adhesive resin composition is transparent and in a liquid state, the adhesive resin composition can be used in such lamination, as LOCA as it is.

"Transparent" indicates that a haze value when measuring an adhesive sheet adjusted to a thickness of 150 μm by a method in accordance with JIS K7361 is equal to or less than 10.

As a material of the member, for example, glass, polyethylene terephthalate, polycarbonate, polycarbonate, an acrylic resin, polyvinyl alcohol, a silicone resin, and the like are exemplified.

An example of a lamination method of a member using the adhesive resin composition of (1) is shown below.

First, the adhesive resin composition of (1) is coated on a surface of a first member to form an adhesive layer, and a second member is laminated thereon, and cured depending on the necessity. In this manner, a laminate obtained by laminating the first member and the second member via an adhesive layer is made.

Coating of the adhesive resin composition of (1) can be performed by using a known wet coat method such as slit coat and spin coat. Or, a method of laminating the second member by coating a certain amount of the adhesive resin composition and filling the adhesive resin composition between the first member and the second member may be used.

A coating amount of the adhesive resin composition of (1) is set depending on a thickness of the formed adhesive layer.

A thickness of the adhesive layer can be appropriately set depending on the use, and is not particularly limited. However, the thickness of the adhesive layer is typically approximately 10 μm to 500 μm.

In a case where the adhesive resin composition is curable, the adhesive layer (adhesive resin composition) may be cured before and after laminating the second member.

A curing method of the adhesive layer is not particularly limited. For example, in a case where the adhesive resin composition includes polyfunctional (meth)acrylate and a photopolymerization initiator as a crosslinking agent, it is possible to cure (photopolymerize) the adhesive layer by emission of an active energy ray such as ultraviolet ray. In a case where the copolymer (A) has a reactive group such as a hydroxyl group and the adhesive resin composition includes a crosslinking agent (isocyanate-based crosslinking agent) obtained by chemically binding with the reactive group by heat, it is possible to cure (thermo-cure) of the adhesive layer by heating.

In a case where the adhesive layer is photocured, as an active energy ray, an ultraviolet ray is preferable from a viewpoint of versatility. As a light source of the ultraviolet ray, for example, a xenon lamp, a high-pressure mercury lamp, a metal halide lamp, and the like are exemplified.

In a case where the adhesive layer is thermo-cured, and thermo-curing can be performed by using known heating means, for example, a dry furnace such as hot air furnace, electric furnace, and infrared induction heating furnace, as heating means. The heating temperature is not particularly limited, but is preferably approximately 50° C. to 180° C. The heating time is not particularly limited, but is preferably approximately 10 seconds to 60 minutes.

Before thermo-curing, in order to prevent occurrence of defects, preliminary heating, air blow, and the like may be performed under a heating condition in which the adhesive resin composition is not substantially cured. The preliminary heating can be performed at a temperature of approximately 30° C. to 100° C. for approximately 30 seconds to 15 minutes. The air blow can be generally performed by blowing air heated at a temperature of approximately 30° C. to 100° C. for 30 seconds to 15 minutes onto a coating surface.

After thermo-curing, sanitation may be performed. The sanitation condition can be approximately a temperature of 0° C. to 60° C. and 1 to 10 days.

In the adhesive resin composition of the present invention, since the copolymer (A) is included, it is possible to form an adhesive layer excellent in wet heat clouding resistance and low corrosiveness. In addition, the adhesive layer is also excellent in adhesiveness and holding force.

[Adhesive Sheet]

The adhesive sheet of the present invention is an adhesive sheet (adhesive layer) using the adhesive resin composition.

In a case where the adhesive resin composition is curable, the adhesive sheet of the present invention may be formed of the adhesive resin composition, and may be formed of a cured product of the adhesive resin composition. From a viewpoint of handleability of the adhesive sheet, the adhesive sheet is preferably a cured product of the adhesive resin composition.

The adhesive sheet of the present invention may be a transparent double-sided adhesive sheet.

A thickness of the adhesive sheet of the present invention can be appropriately set depending on the use, and is not particularly limited. However, the thickness of the adhesive sheet is typically approximately 10 μm to 500 μm.

The adhesive sheet of the present invention may be an adhesive sheet with an exfoliative substrate in which the exfoliative substrate is laminated on a single surface or both surfaces of the adhesive sheet.

The adhesive sheet of the present invention can be produced by forming the adhesive resin composition into a sheet form, and curing thereof depending on the necessity.

Formation of the adhesive resin composition can be performed by a known method. For example, in a case where the adhesive resin composition of the present invention is in a solid form (for example, in a case of the adhesive resin composition (2)), a method of disposing the adhesive resin composition between a pair of exfoliative substrates, heating the adhesive resin composition from both sides of the pair of the exfoliative substrates to melt the adhesive resin composition, and forming the adhesive resin composition into a sheet form and the like are exemplified. In a case where the adhesive resin composition of the present invention is in a liquid form (for example, in a case of the adhesive resin composition (1) or (3)), a method of coating the adhesive resin composition on an exfoliative substrate, drying thereof depending on the necessity, and forming the adhesive resin composition into a sheet form and the like are exemplified.

Curing can be performed in the same manner as the curing of the adhesive layer.

The adhesive sheet of the present invention can be used in lamination of members and the like, similar to the adhesive resin composition.

For example, the adhesive sheet is disposed on a surface of a first member, and a second member is laminated thereon, and cured depending on the necessity. In this manner, a laminate obtained by laminating the first member and the second member via an adhesive sheet is made.

Since the adhesive sheet of the present invention uses the adhesive resin composition, the adhesive sheet is excellent in wet heat clouding resistance and low corrosiveness. In addition, the adhesive sheet is also excellent in adhesiveness and holding force.

EXAMPLES

Hereinafter, examples of the present invention will be described in more details, but the following examples do not limit the scope of the present invention. In each of the following examples, "part" indicates "part by mass".

A measurement method used in each example is shown below.

<Measurement Method>

(Number Average Molecular Weight of Macromonomer)

A number average molecular weight (Mn) of a macromonomer was measured by using a gel filtration chromatography (GPC) apparatus (Tosoh Corporation, HLC-8320). 0.2% by mass of a tetrahydrofuran (THF) solution of the macromonomer was prepared, 10 µL of the solution was injected into the apparatus with a column manufactured by Tosoh Corporation (TSKgel SuperHZM-MXHZM-MXHZ2000, TSKguardcolumn SuperHZ-L), measurement was performed under a condition of flow rate: 0.35 mL/minute, eluent: THF (stabilizer BHT), column temperature: 40° C., and a number average molecular weight (Mw) was calculated in terms of standard polystyrene.

(Weight Average Molecular Weight of Copolymer)

A weight average molecular weight (Mw) of the copolymer was measured by using a GPC apparatus (Tosoh Corporation, HLC-8120). 0.3% by mass of a THF solution of the copolymer was prepared, 20 µL of the solution was injected into the apparatus with a column manufactured by Tosoh Corporation (TSKgel SuperHM-HX4, TSKguardcolumn SuperH-H), measurement was performed under a condition of flow rate: 0.6 mL/minute, eluent: THF (stabilizer BHT), column temperature: 40° C., and a weight average molecular weight (Mw) was calculated in terms of standard polystyrene.

(Acid Value of Copolymer)

An acid value is measured by a method of precisely adding 0.5 g of a sample to a beaker (A(g)), adding 50 mL of a toluene/95% ethanol solution and several droplets of phenolphthalein thereto, and titrating the resultant product with 0.5 M of a potassium hydroxide solution (titration amount=B (mL)). Titer of the potassium hydroxide solution=f is set, blank measurement is similarly performed (titration amount=C (mL)), and calculation is performed by the following formula.

$$\text{Acid value (mgKOH/g)} = \{(B-C) \times 0.2 \times 56.11 \times f\}/A/\text{solid content}$$

(Ethylenic Unsaturated Bond Equivalent of Copolymer)

An ethylenic unsaturated bond equivalent of the copolymer (A) was calculated by the following formula from a charge amount of a monomer used in production of the copolymer (A).

Ethylenic unsaturated bond equivalent (g/mol)=(mass of all charged monomer (g)+mass of polymerization initiator (g))/amount of monomer used in introduction of ethylenic unsaturated bond (mol)

Synthesis Example 1

(Production of Dispersant 1)

900 parts of deionized water, 60 parts of 2-sulfoethyl sodium methacrylate, 10 parts of potassium methacrylate, and 12 parts of methyl methacrylate (MMA) were put in a polymerization apparatus with a stirrer, a cooling tube, a thermometer, and a nitrogen gas introduction tube, stirred, and while performing nitrogen substitution of the inside of the polymerization apparatus, the temperature was raised to 50° C. As a polymerization initiator, 0.08 parts of 2,2'-azobis (2-methyl propion amidine) dihydrochloride was added thereto, and the temperature was further raised to 60° C. After raising the temperature, MMA was consecutively dropped at a speed of 0.24 parts/minute for 75 minutes using a dropping pump. A reaction solution was maintained at 60° C. for 6 hours, and then cooled to a room temperature to obtain a dispersant 1 of a solid content of 10% by mass which is a transparent aqueous solution.

(Production of Chain Transfer Agent 1)

Under a nitrogen atmosphere, 1.00 g of cobalt (II) acetate tetrahydrate and 1.93 g of diphenyloxime and 80 mL of diethyl ether deoxidized by nitrogen bubbling in advance were put into a synthesis apparatus with a stirring device, and stirred at room temperature for 30 minutes. Then, 10 mL of a boron trifluoride diethyl ether complex was added thereto, and further stirred for 6 hours. The mixture product was filtrated, and the solid was washed with diethyl ether, and vacuum-dried for 15 hours to obtain 2.12 g of a chain transfer agent 1 which is a red-brown solid.

(Production of Macromonomer) 145 parts of deionized water, 0.1 parts of sodium sulfate, and 0.25 parts of a dispersant 1 (10% by mass of solid content 1) were put into a polymerization apparatus with a stirrer, a cooling tube, a thermometer, and a nitrogen gas introduction tube, and stirred to obtain a uniform aqueous solution. Subsequently, 100 parts of MMA, 0.0035 parts of the chain transfer agent 1, and 0.4 parts of Perocta O (registered trademark) (1,1,3,3-tetramethyl butyl peroxy-2-ethyl hexanoate, manufactured by Nippon Oil & Fats Co., Ltd.) as a polymerization initiator were added thereto to obtain an aqueous suspension.

Subsequently, the inside of the polymerization apparatus was nitrogen-substituted, the temperature was raised to 80° C., reaction was performed for 3.5 hours, and in order to further enhance a polymerization rate, the temperature was raised to 90° C., and the resultant product was maintained for 1 hour. After that, a reaction solution was cooled to 40° C. to obtain an aqueous suspension including a macromonomer. The aqueous suspension was filtrated with a filter, and residues remaining in the filter was washed with deionized water, dehydrated, and dried at 40° C. for 16 hours to obtain a macromonomer (a-1). A number average molecular weight of the macromonomer (a-1) was 3,000.

Synthesis Examples 2 to 4

In the same manner as in (Production of macromonomer) of Synthesis Example 1, except that the monomer composition, the charge amount of the polymerization initiator (Perocta O), and the charged amount of the chain transfer agent 1 in Synthesis Example 1 were differently set as shown in Table 1, macromonomers (a-2) to (a-4) were obtained.

Number average molecular weights of (a-2) to (a-4) are shown in Table 1.

TABLE 1

| Macromonomer | | | Synthesis Example 1 a-1 | Synthesis Example 2 a-2 | Synthesis Example 3 a-3 | Synthesis Example 4 a-4 |
|---|---|---|---|---|---|---|
| Monomer composition | MMA | part | 100 | 50 | 50 | 95 |
| | IBXMA | part | — | 50 | 50 | — |
| | 2-HEMA | | — | — | — | 5 |
| Polymerization initiator | Perocta O | part | 0.4 | 0.5 | 0.3 | 0.6 |
| Chain transfer agent | Chain transfer agent 1 | part | 0.0035 | 0.0034 | 0.0013 | 0.0043 |
| | Mn | | 3000 | 3000 | 6800 | 3000 |

In Tables 2 to 7, (AA-1) to (AA-14) indicate kinds of copolymer solutions in examples in which an adhesive sheet was produced, and adhesiveness, holding force, wet heat clouding resistance, and low corrosiveness were evaluated. In addition, (BA-1) to (BA-16) indicate kinds of copolymer solutions in production examples and examples in which a weight average molecular weight (Mw) of a copolymer and an ethylenic unsaturated bond equivalent were measured.

Example A1

As initial charge, 40 parts of ethyl acetate, 1 part of isopropyl alcohol (IPA), 15 parts of macromonomer (a-1), 3 parts of acrylamide (Aam), and 5 parts of 2-ethyl hexyl acrylate (2-EHA) were put into a four-neck flask with a stirring device, a thermometer, a cooling tube, and a nitrogen gas introduction tube, and an external temperature was raised to 85° C. under a nitrogen gas ventilation. After the external temperature reached 85° C. and an internal temperature was stabilized, a mixture product (drop charge) formed of 20 parts of ethyl acetate, 77 parts of 2-EHA, 0.13 parts of NYPER BMT-K40 (manufactured by Nippon Oil & Fats Co., Ltd., product name) which is a polymerization initiator was dropped for 4 hours. After maintaining the resultant product for 1 hour after the dropping was finished, a mixture product formed of 0.5 parts of Perocta O and 10 parts of ethyl acetate was added thereto for 1 hour. After that, after maintaining the resultant product for 2 hours, 0.5 parts of an anti-oxidant (manufactured by BASF Corporation, product name "Irganox (registered trademark) 1010") was injected thereto, ethyl acetate was added thereto such that a solid content (proportion of a monomer charge amount in (monomer+solvent charge amount)) was 50%, and then cooled to room temperature to obtain a copolymer solution (AA-1).

The weight average molecular weight (Mw) in the copolymer solution (AA-1) is shown in Table 2.

Regarding the copolymer solution (AA-1), an adhesive sheet was produced in the following procedure, and adhesiveness, holding force, wet heat clouding resistance, and low corrosiveness were evaluated. The result is shown in Table 2.

(Production of Adhesive Sheet)

After coating the copolymer solution (AA-1) on an exfoliation-treated polyethylene terephthalate (PET) film (hereinafter, referred to as an exfoliative PET film) with an applicator of 500 μm so as to have an area of 100 mm×300 mm, drying was performed at 90° C. for 1.5 hours, and the upper surface was covered with an exfoliative PET to obtain an adhesive sheet having a composition of exfoliative PET-adhesive layer-exfoliative PET.

(Adhesiveness)

An exfoliative PET film on one surface of the adhesive sheet was exfoliated, and 38 μm of a PET film was laminated instead to obtain a laminate. The laminate was cut into strips of 25 mm wide and 300 mm long, and an exfoliative PET film on the other surface was exfoliated to expose the adhesive layer, and laminated on a glass plate such that the laminated surface was 25 mm×120 mm using 2 kg of a hand roller. Then in accordance with JIS Z 0237, an exfoliation intensity (N/25 mm) with respect to the glass plate was measured at an exfoliation angle of 180° C. and an elongation rate of 300 mm/min, and adhesiveness was determined.

A: Adhesiveness is equal to or more than 3 N/25 mm.

B: Adhesiveness is equal to or more than 1 N/25 mm and less than 3 N/25 mm.

C: Adhesiveness is less than 1 N/25 mm.

(Holding Force)

An exfoliative PET film on one surface of the adhesive sheet was exfoliated, and 38 μm of a PET film was pressed instead using 2 kg of a hand roller to obtain a laminate. The laminate was cut into strips of 25 mm×100 mm, and an exfoliative PET film on the other surface was exfoliated, and horizontally laminated on a stainless (SUS) plate of 30 mm×100 mm using 2 kg of a hand roller such that the laminated surface was 20×25 mm. The laminate is cut into strips of 25 mm wide and 300 mm long, the other exfoliative PET film is exfoliated to expose the adhesive layer, and the bonding surface is adjusted to 25 mm×120 mm by using a hand roller of 2 kg. After performing sanitation at 70° C. for 30 minutes in accordance with JIS Z 0237, a weight of 0.5 kg was attached at the tip of the PET film, and a retention time was measured in a constant temperature layer of 70° C. Holding force was determined by the following criteria.

A: Retention time is equal to or more than 5 minutes.

B: Retention time is less than 5 minutes.

(Wet Heat Clouding Resistance)

An exfoliative PET film on one surface of the adhesive sheet was exfoliated, 38 μm of a PET film was laminated, an exfoliative film on the other surface was exfoliated and laminated on a glass plate to prepare a test piece, and an initial haze value $H_1$ was measured in accordance with JIS-K-7136. The test piece was left in a constant-temperature constant-humidity bath of 65° C. and 95 RH % for 1,000 hours, a haze value $H_2$ after 30 minutes after being taken out therefrom was measured, and a value of $H_2-H_1$ was determined by the following criteria.

A: $H_2-H_1$ is equal to or less than 4.0.
B: $H_2-H_1$ is more than 4.0 and equal to or less than 10.0.
C: $H_2-H_1$ is more than 10.0.

(Low Corrosiveness)

An exfoliative PET film on one surface of the adhesive sheet was exfoliated, 38 of a PET film was laminated, an exfoliative film on the other surface was exfoliated and laminated on a Tetoraito TCF (KB300NS2-175-UH/P 50 mm×50 mm) of OIKE & Co., Ltd. such that the laminated surface was 50 mm×40 mm and a surface with no adhesive layer in both tips was 50 mm×5 mm to prepare a test piece, and an electric resistance value $\Omega_1$ at both tips was measured. The test piece was left in a constant-temperature constant-humidity bath of 65° C. and 95 RH % for 1,000 hours, an electric resistance value $\Omega_2$ after 30 minutes after being taken out therefrom was measured, and a change rate (%) was calculated by the following formula (4).

$$\text{Change rate }(\%)=(\Omega_2-\Omega_1)/\Omega_1 \times 100 \quad (4)$$

The change rate was determined by the following criteria.
A: The change rate is equal to or less than 2,000%.
B: The change rate is more than 2,000%.

Examples A2 to A11, Comparative Examples A1 to A3

In the same manner as in Example A1 except that compositions of mixture products (drop charge) dropped after initial dropping and raise of temperature were modified as shown in Table 2, copolymer solutions (AA-2) to (AA-14) were obtained.

A weight average molecular weight (Mw) of the copolymer in the copolymer solution obtained in each example is shown in Table 2.

In addition, regarding each copolymer solution, an adhesive sheet was produced, and adhesiveness, holding force, wet heat clouding resistance, and low corrosiveness were evaluated in the same manner as in Example A1. The result is shown in Table 2.

Example A12

After desolvating 80 parts of the copolymer solution (AA-4) such that the solid content was equal to or more than 99%, 60 parts of isodecyl acrylate (IDAA), 1 part of pentaerythritol triacrylate (PETA), and 3 parts of photopolymerization initiator (manufactured by BASF Corporation, product name "IRGACURE (registered trademark) 184", 1-hydroxy cyclohexyl phenyl ketone) were mixed therewith to prepare a liquid adhesive resin composition.

Regarding the obtained adhesive resin composition, an adhesive sheet was produced in the following procedure and adhesiveness, holding force, wet heat clouding resistance, and low corrosiveness were evaluated in the same manner as in Example A1. The result is shown in Table 3.

(Production of Adhesive Sheet)

After coating the adhesive resin composition on an exfoliative PET film with an applicator of 500 μm, 50 μm of an exfoliative PET film was laminated on an adhesive surface, and an ultraviolet ray (UV) was emitted under the following condition to cure an adhesive layer, thereby obtaining an adhesive sheet having a composition of exfoliative PET-adhesive layer-exfoliative PET.

"Emission Condition"

Light source: high-pressure mercury lamp, emission intensity: 200 mW/cm$^2$, integral of light: 3,000 mJ/cm$^2$.

Example A13

In the same manner as in Example A12 except that kinds and amounts (part) of the used materials were as shown in Table 3, a liquid adhesive resin composition was prepared, an adhesive sheet was produced, and adhesiveness, holding force, wet heat clouding resistance, and low corrosiveness were evaluated. The result is shown in Table 3.

Example A14

After desolvating 200 parts of the copolymer solution (AA-4) such that the solid content was equal to or more than 99%, 5 parts of PETA and 0.5 parts of photopolymerization initiator (manufactured by BASF Corporation, product name "IRGACURE 184", 1-hydroxy cyclohexyl phenyl ketone) were mixed therewith to prepare an adhesive resin composition.

Regarding the obtained adhesive resin composition, an adhesive sheet was produced in the following procedure, and regarding the adhesive sheet, adhesiveness, holding force, wet heat clouding resistance, and low corrosiveness were evaluated in the same manner as in Example A1. The result is shown in Table 3.

(Production of Adhesive Sheet)

The adhesive resin composition was sandwiched between a pair of exfoliative PET films, an adhesive layer having a film thickness of 150 μm was formed by thermal press at 100° C., and an ultraviolet ray (UV) was emitted under the following condition to cure the adhesive layer, thereby obtaining an adhesive sheet having a composition of exfoliative PET-adhesive layer-exfoliative PET.

"Emission Condition" Light source: high-pressure mercury lamp, emission intensity: 200 mW/cm$^2$, integral of light: 3,000 mJ/cm$^2$.

Example A15

In the same manner as in Example A14 except that kinds and amounts (part) of the used materials were as shown in Table 3, an adhesive resin composition was prepared, an adhesive sheet was produced, and adhesiveness, holding force, wet heat clouding resistance, and low corrosiveness were evaluated. The result is shown in Table 3.

Example A16

0.5 parts of PIC was mixed with 200 parts of the copolymer solution (AA-6) to prepare an adhesive resin composition. Regarding the obtained adhesive resin composition, an adhesive sheet was produced in the following procedure, and regarding the adhesive sheet, adhesiveness, holding force, wet heat clouding resistance, and low corrosiveness were evaluated in the same manner as in Example A1. The result is shown in Table 3.

(Production of Adhesive Sheet)

After coating the adhesive resin composition on an exfoliative PET film with an applicator of 500 μm, and performing heating at 120° C. for 1 hour to cure an adhesive layer, the exfoliative PET film was laminated on an adhesive surface to obtain an adhesive sheet having a composition of exfoliative PET-adhesive layer-exfoliative PET.

Example A17

1.0 parts of Al (acac)$_3$ was mixed with 200 parts of the copolymer solution (AA-6) to prepare an adhesive resin composition. Regarding the obtained adhesive resin composition, adhesiveness, holding force, wet heat clouding resistance, and low corrosiveness were evaluated in the same manner as in Example A16. The result is shown in Table 3.

TABLE 2

| | | | | Example A1 | Example A2 | Example A3 | Example A4 | Example A5 | Example A6 | Example A7 |
|---|---|---|---|---|---|---|---|---|---|---|
| Initial charge | Copolymer solution | | | AA-1 | AA-2 | AA-3 | AA-4 | AA-5 | AA-6 | AA-7 |
| | Macromonomer | kind | | a-1 | a-1 | a-2 | a-2 | a-2 | a-2 | a-3 |
| | | | part | 15 | 7 | 13.5 | 13.5 | 13.5 | 13.5 | 13.5 |
| | Vinyl monomer (b) | Aam | part | 3 | 2 | 1.4 | 2.8 | 5.6 | 2.8 | 2.8 |
| | | DMAAm | part | — | — | — | — | — | — | — |
| | | ACMO | part | — | — | — | — | — | — | — |
| | | HEAA | part | — | — | — | — | — | — | — |
| | | 2-EHA | part | 5 | 5 | 4 | 4 | 4 | 4 | 4 |
| | | LA | part | — | — | 4.5 | 4.4 | 4.1 | 4.4 | 4.4 |
| | Solvent | Ethyl acetate | part | 40 | 40 | 40 | 40 | 40 | 40 | 40 |
| | | IPA | part | 1 | 1 | 1.2 | — | 1.2 | — | — |
| Drop charge | Vinyl monomer (b) | 2-EHA | part | 77 | 86 | 36 | 36 | 36 | 36 | 36 |
| | | LA | part | — | — | 40.6 | 39.3 | 36.8 | 39.2 | 39.3 |
| | | AA | part | — | — | — | — | — | — | — |
| | | 2-HEA | part | — | — | — | — | — | 0.1 | — |
| | Solvent | Ethyl acetate | part | 20 | 20 | 20 | 20 | 20 | — | 20 |
| | Initiator | BMTK40 | part | 0.13 | 0.13 | 0.13 | 0.13 | 0.13 | 0.13 | 0.13 |
| | Polymerization temperature | | ° C. | 85 | 85 | 85 | 85 | 85 | 85 | 85 |
| | Mw (10,000) | | | 13 | 19 | 18 | 16 | 13 | 16 | 15 |
| | Acid value (mgKOH/g) | | | 0 | 0 | 0 | 0 | 0 | 0 | 0 |
| Evaluation | Adhesiveness A: 4→3N or more, B: 1N or more | | | B | A | B | A | A | A | B |
| | Holding force A: 5 minutes or more, B: less than 5 minutes | | | A | A | A | A | A | A | A |
| | Wet heat clouding resistance A: 4 or less, B: 4-10, C 10 or more | | | A | B | B | A | A | A | B |
| | Low corrosiveness | | | A | A | A | A | A | A | A |

| | | | | Example A8 | Example A9 | Example A10 | Example A11 | Comparative Example A1 | Comparative Example A2 | Comparative Example A3 |
|---|---|---|---|---|---|---|---|---|---|---|
| Initial charge | Copolymer solution | | | AA-8 | AA-9 | AA-10 | AA-11 | AA-12 | AA-13 | AA-14 |
| | Macromonomer | kind | | a-2 | a-2 | a-2 | a-2 | a-2 | a-1 | |
| | | | part | 30 | 13.5 | 13.5 | 13.5 | 13.5 | 13.5 | |
| | Vinyl monomer (b) | Aam | part | 2.8 | — | — | — | — | — | 1.4 |
| | | DMAAm | part | — | 3.9 | — | — | — | — | — |
| | | ACMO | part | — | — | 5.4 | — | — | — | — |
| | | HEAA | part | — | — | — | 6.2 | — | — | — |
| | | 2-EHA | part | 4 | 4 | 4 | 4 | 4 | 4 | 4 |
| | | LA | part | 4.4 | 4.4 | 4.4 | 4.4 | 4.4 | 4.4 | 4.5 |
| | Solvent | Ethyl acetate | part | 40 | 40 | 40 | 40 | 40 | 40 | 40 |
| | | IPA | part | — | 1 | 1 | 1 | 1 | 1 | 1 |
| Drop charge | Vinyl monomer (b) | 2-EHA | part | 34 | 36 | 36 | 36 | 36 | 36 | 86 |
| | | LA | part | 33.2 | 42.6 | 41.1 | 40.3 | 39.3 | 32.1 | — |
| | | AA | part | — | — | — | — | 2.8 | — | — |
| | | 2-HEA | part | — | — | — | — | — | — | — |
| | Solvent | Ethyl acetate | part | 20 | 20 | 20 | 20 | 20 | 20 | 20 |
| | Initiator | BMTK40 | part | 0.13 | 0.13 | 0.13 | 0.13 | 0.13 | 0.13 | 0.13 |
| | Polymerization temperature | | ° C. | 85 | 85 | 85 | 85 | 85 | 85 | 85 |
| | Mw (10,000) | | | 9.1 | 16 | 16 | 16 | 16 | 16 | 16 |
| | Acid value (mgKOH/g) | | | 0 | 0 | 0 | 0 | 10.9 | 0 | 0 |
| Evaluation | Adhesiveness A: 4→3N or more, B: 1N or more | | | B | A | A | A | A | B | B |
| | Holding force A: 5 minutes or more, B: less than 5 minutes | | | A | A | A | A | A | A | B |
| | Wet heat clouding resistance A: 4 or less, B: 4-10, C 10 or more | | | A | B | B | B | B | C | C |
| | Low corrosiveness | | | A | A | A | A | B | A | A |

TABLE 3

|  |  |  | Example A12 | Example A13 | Example A14 | Example A15 | Example A16 | Example A17 |
|---|---|---|---|---|---|---|---|---|
| Adhesive composition | Copolymer solution | Kind | AA-4 | AA-4 | AA-4 | AA-4 | AA-6 | AA-6 |
|  |  | Part | 80 | 100 | 200 | 200 | 200 | 200 |
|  | IDAA | Part | 60 | 100 | — | — | — | — |
|  | PETA | Part | 1 | — | 5 | 5 | — | — |
|  | UV3000B | Part | — | 10 | — | — | — | — |
|  | BP | Part | — | — | — | 0.5 | — | — |
|  | Irg184 | Part | 3 | 7 | 0.5 | — | — | — |
|  | PIC | Part | — | — | — | — | 0.5 | — |
|  | Al(acac)$_3$ | Part | — | — | — | — | — | 1 |
| Evaluation | Adhesiveness |  | B | B | B | B | B | B |
|  | Holding force |  | A | A | A | A | A | A |
|  | Wet heat clouding resistance |  | A | A | A | A | A | A |
|  | Low corrosiveness |  | A | A | A | A | A | A |

Abbreviations in the tables have the following meaning.
MMA: Methyl methacrylate.
IBXMA: Isobornyl methacrylate.
Aam: Acrylamide.
DMAAm: N, N-dimethyl acrylamide.
ACMO: Acryloyl morpholine.
HEAA: Hydroxy ethyl acrylamide.
2-EHA: 2-Ethyl hexyl acrylate.
LA: Lauryl acrylate.
AA: Acrylic acid.
2-HEA: 2-Hydroxy ethyl acrylate.
IPA: Isopropyl alcohol.
BMTK40: NYPER BMT-K40 (manufactured by Nippon Oil & Fats Co., Ltd., product name).
IDAA: Isodecyl acrylate.
PETA: NK ester TMM-3L manufactured by Shin-Nakamura Chemical Co., Ltd.
UV3000B: Urethane acrylate (manufactured by Mitsubishi Chemical Corporation, product name).
BP: Benzophenone.
Irg184: IRGACURE184 (manufactured by BASF Corporation, product name).
PIC: Polyisocyanate ("Coronate L", manufactured by Tosoh Corporation, product name).
Al (acac)$_3$: Aluminum trisacetyl acetonate.

Production Example 1

As initial charge, 50 parts of methyl ethyl ketone (MEK), 13.5 parts of macromonomer (a-2), 2.8 parts of acrylamide (Aam), 4.4 parts of lauryl acrylate (LA), and 4 parts of 2-ethyl hexyl acrylate (2-EHA) were put into a four-neck flask with a stirring device, a thermometer, a cooling tube, and a nitrogen gas introduction tube, and an external temperature was raised to 85° C. under a nitrogen gas ventilation. After the external temperature reached 85° C. and an internal temperature was stabilized, a mixture product (drop charge) formed of 39.05 parts of LA, 36 parts of 2-EHA, 0.25 parts of MOI, and 0.05 parts of 2,2'-azobis(2-methyl butironitrile) (AMBN) (manufactured by Otsuka Chemical Co., Ltd.) which is a polymerization initiator was dropped for 4 hours. After maintaining the resultant product for 1 hour after the dropping was finished, 0.05 parts of AMBN was added thereto. After that, after maintaining the resultant product for 6 hours, 0.05 parts of dibutyl hydroxy toluene was injected thereinto, 0.03 parts of dibutyl tin dilaurate and 0.21 parts of 2-hydroxy ethyl methacrylate (2-HEMA) were added thereto, and after maintaining the resultant product for 6 hours, MEK was added thereto such that a solid content was 55%, and then cooled to room temperature to obtain a copolymer solution (BA-1).

The weight average molecular weight (Mw) in the copolymer solution (BA-1) and an ethylenic unsaturated bond equivalent are shown in Table 4.

Production Examples 2 to 16

In the same manner as in Example B1 except that each composition of initial charge, a monomer contained in a mixture product dropped after raising the temperature (drop charge), and a monomer added along with dibutyl tin dilaurate (charge at the time of addition) were modified as shown in Table 4, copolymer solutions (BA-2) to (BA-16) were obtained.

A weight average molecular weight (Mw) and an ethylenic unsaturated bond equivalent in the copolymer solution obtained in each example are shown in Table 4.

Example B1

182 parts of the copolymer solution (BA-1) (100 parts as a solid content) and 1.5 parts of a photopolymerization initiator (manufactured by BASF Corporation, product name "IRGACURE (registered trademark) 184", 1-hydroxy cyclohexyl phenyl ketone) were mixed with each other to prepare a liquid adhesive resin composition.

Regarding the obtained adhesive resin composition, an adhesive sheet was produced by the following procedure, and regarding the adhesive sheet, adhesiveness and holding force were evaluated by the following procedure. The result is shown in Table 5.

(Production of Adhesive Sheet)

The adhesive resin composition was coated on an exfoliative polyethylene terephthalate (PET) film having a thickness of 50 μm with an applicator such that a thickness of an adhesive layer was 100 μm, and dried at 90° C. for 1 hour to form an adhesive layer. After that, a transparent exfoliative PET film having a thickness of 50 μm was laminated on an adhesive surface, and an ultraviolet ray (UV) was emitted under the following condition to cure the adhesive layer, thereby obtaining an adhesive sheet having a composition of exfoliative PET film-adhesive layer-exfoliative PET film. The exfoliative PET film means an exfoliation-treated PET film.

"Emission Condition" Light source: high-pressure mercury lamp, emission intensity: 200 mW/cm$^2$, integral of light: 3,000 mJ/cm$^2$.

(Adhesiveness)

An exfoliative PET film on one surface of the adhesive sheet was exfoliated, and a PET film having a thickness of 38 μm was laminated instead to obtain a laminate. The laminate was cut into strips of 25 mm wide and 300 mm long, and an exfoliative PET film on the other surface was exfoliated to expose the adhesive layer, and laminated on a glass plate such that the laminated surface was 25 mm×120 mm using 2 kg of a hand roller. Then in accordance with JIS Z 0237, an exfoliation intensity (N/25 mm) with respect to the glass plate was measured at an exfoliation angle of 180° C. and an elongation rate of 300 mm/min, and adhesiveness was determined.

A: Adhesiveness is equal to or more than 4 N/25 mm.
B: Adhesiveness is equal to or more than 1 N/25 mm and less than 4 N/25 mm.
C: Adhesiveness is less than 1 N/25 mm.

(Holding Force)

An exfoliative PET film on one surface of the adhesive sheet was exfoliated, and 38 μm of a PET film was pressed instead using 2 kg of a hand roller to obtain a laminate. The laminate was cut into strips of 25 mm×100 mm, and an exfoliative PET film on the other surface was exfoliated, and horizontally laminated on a stainless (SUS) plate of 30 mm×100 mm using 2 kg of a hand roller such that the laminated surface was 20×25 mm. After performing sanitation at 70° C. for 30 minutes in accordance with JIS Z 0237, a weight of 1 kg was attached at the tip of the 38 μm of PET film, and a retention time was measured in a constant temperature layer of 70° C. and 40% RH. Holding force was determined by the following criteria.

A: Retention time is equal to or more than 100 minutes.
B: Retention time is equal to or more than 60 minutes and less than 100 minutes.
C: Retention time is less than 60 minutes.

Examples B2 to B16, Comparative Examples B1 and B2

In the same manner as in Example B1 except that kinds and amounts (part) of the used materials were as shown in Tables 5 to 7, a liquid adhesive resin composition was prepared, an adhesive sheet was produced, and adhesiveness and holding force were evaluated. The result is shown in Tables 5 to 7.

TABLE 4

|  |  |  |  | Production Example 1 | Production Example 2 | Production Example 3 | Production Example 4 | Production Example 5 | Production Example 6 | Production Example 7 | Production Example 8 |
|---|---|---|---|---|---|---|---|---|---|---|---|
|  | Copolymer solution |  |  | BA-1 | BA-2 | BA-3 | BA-4 | BA-5 | BA-6 | BA-7 | BA-8 |
| Initial charge | Macromonomer | Kind | | a-2 | a-2 | a-2 | a-2 | a-1 | a-2 | a-2 | a-2 |
|  |  | | Part | 13.5 | 13.5 | 13.5 | 13.5 | 15 | 13.5 | 13.5 | 13.5 |
|  | Vinyl monomer (b) | Aam | Part | 2.8 | 2.8 | 2.8 | 2.8 | — | 2.8 | 2.8 | 2.8 |
|  |  | 2-EHA | Part | 4 | 4 | 4 | 4 | — | 4 | 4 | 4 |
|  |  | LA | Part | 4.4 | 4.4 | 4.4 | 4.4 | — | 4.4 | 4.4 | 4.4 |
|  | Solvent | MEK | Part | 50 | 50 | 50 | 50 | 80 | 50 | 50 | 50 |
| Drop charge | Vinyl monomer (b) | 2-EHA | Part | 36 | 36 | 36 | 36 | — | 36 | 36 | 36 |
|  |  | LA | Part | 39.05 | 39.05 | 39.05 | 38.8 | — | 39.07 | 39.07 | 39.07 |
|  |  | n-BA | Part | — | — | — | — | 80.75 | — | — | — |
|  |  | AA | Part | — | — | — | — | 4 | — | — | — |
|  |  | MOI | Part | 0.25 | 0.25 | 0.25 | 0.5 | 0.25 | — | — | — |
|  |  | AOI | Part | — | — | — | — | — | 0.23 | — | — |
|  |  | 4-HBA | Part | — | — | — | — | — | — | 0.23 | 0.23 |
| Charge at the time of addition | Monomer | 2-HEMA | Part | 0.21 | — | — | — | — | — | — | — |
|  |  | 2-HEA | Part | — | 0.19 | — | — | — | — | — | — |
|  |  | 4-HBA | Part | — | — | 0.23 | 0.46 | 0.46 | 0.23 | — | — |
|  |  | AOI | Part | — | — | — | — | — | — | 0.23 | — |
|  |  | MOI | Part | — | — | — | — | — | — | — | 0.23 |
|  | Mw (10,000) | | | 16 | 16 | 16 | 16 | 20 | 16 | 16 | 16 |
|  | Ethylenic unsaturated bond equivalent (g/mol) (10,000) | | | 6.21 | 6.23 | 6.29 | 3.15 | 6.29 | 6.29 | 6.16 | 6.16 |

|  |  |  |  | Production Example 9 | Production Example 10 | Production Example 11 | Production Example 12 | Production Example 13 | Production Example 14 | Production Example 15 | Production Example 16 |
|---|---|---|---|---|---|---|---|---|---|---|---|
|  | Copolymer solution |  |  | BA-9 | BA-10 | BA-11 | BA-12 | BA-13 | BA-14 | BA-15 | BA-16 |
| Initial charge | Macromonomer | Kind | | a-2 | a-1 | a-1 | a-1 | a-1 | a-1 | a-4 | a-1 |
|  |  | | Part | 13.5 | 14 | 14 | 14 | 14 | 14 | 14 | 14 |
|  | Vinyl monomer (b) | Aam | Part | 2.8 | — | — | — | — | — | — | — |
|  |  | 2-EHA | Part | 4 | — | — | — | — | — | — | — |
|  |  | LA | Part | 4.4 | — | — | — | — | — | — | — |
|  | Solvent | MEK | Part | 40 | — | — | — | — | — | — | — |
| Drop charge | Vinyl monomer (b) | 2-EHA | Part | 36 | — | — | — | — | — | — | — |
|  |  | LA | Part | 39.3 | — | — | — | — | — | — | — |
|  |  | n-BA | Part | — | 85.6 | 85.2 | 84.4 | 85.2 | 85.2 | 86 | 86 |
|  |  | AA | Part | — | — | — | — | — | — | — | — |
|  |  | MOI | Part | — | — | — | — | — | — | — | — |
|  |  | AOI | Part | — | — | — | — | — | — | — | — |
|  |  | 4-HBA | Part | — | 0.4 | 0.8 | 1.6 | 0.8 | 0.8 | — | — |
| Charge at the | Monomer | 2-HEMA | Part | — | — | — | — | — | — | — | — |
|  |  | 2-HEA | Part | — | — | — | — | — | — | — | — |

TABLE 4-continued

|  |  |  |  |  |  |  |  |  |  |
|---|---|---|---|---|---|---|---|---|---|
| time of addition | 4-HBA | Part | — | — | — | — | — | — | — | — |
|  | AOI | Part | — | 0.39 | 0.78 | 1.57 | 0.78 | 0.78 | 0.68 | — |
|  | MOI | Part | — | — | — | — | — | — | — | — |
| Mw (10,000) |  |  | 15 | 12 | 12 | 12 | 6 | 4 | 12 | 12 |
| Ethylenic unsaturated bond equivalent (g/mol) (10,000) |  |  | — | 3.64 | 1.83 | 0.91 | 1.83 | 1.83 | 2.09 | — |

TABLE 5

|  |  |  | Example B1 | Example B2 | Example B3 | Example B4 | Example B5 | Example B6 |
|---|---|---|---|---|---|---|---|---|
| Adhesive composition | Copolymer solution | Kind | BA-1 | BA-1 | BA-1 | BA-2 | BA-3 | BA-4 |
|  |  | Part | 182 | 182 | 182 | 182 | 182 | 182 |
|  | IDAA | Part | — | 70 | — | — | — | — |
|  | PETA | Part | — | 1 | 5 | 5 | 5 | 5 |
|  | UV3000B | Part | — | 10 | — | — | — | — |
|  | Irg184 | Part | 1.5 | 5 | 0.5 | 1.5 | 1.5 | 1.5 |
| Evaluation | Adhesiveness |  | B | B | B | B | B | B |
|  | Holding force |  | B | A | A | A | A | A |

TABLE 6

|  |  |  | Example B7 | Example B8 | Example B9 | Example B10 | Comparative Example B1 |
|---|---|---|---|---|---|---|---|
| Adhesive composition | Copolymer solution | Kind | BA-5 | BA-6 | BA-7 | BA-8 | BA-9 |
|  |  | Part | 182 | 182 | 182 | 182 | 182 |
|  | IDAA | Part | — | — | — | — | — |
|  | PETA | Part | 5 | 5 | 5 | 5 | 5 |
|  | UV3000B | Part | — | — | — | — | — |
|  | Irg184 | Part | 1.5 | 1.5 | 1.5 | 1.5 | 1.5 |
| Evaluation | Adhesiveness |  | A | B | B | B | A |
|  | Holding force |  | A | A | A | A | C |

TABLE 7

|  |  |  | Example B11 | Example B12 | Example B13 | Example B14 | Example B15 | Example B16 | Comparative Example B2 |
|---|---|---|---|---|---|---|---|---|---|
| Adhesive composition | Copolymer solution | Kind | BA-10 | BA-11 | BA-12 | BA-13 | BA-14 | BA-15 | BA-16 |
|  |  | Part | 182 | 182 | 182 | 182 | 182 | 182 | 182 |
|  | IDAA | Part | 100 | 100 | 100 | — | — | — | 100 |
|  | NOA | Part | — | — | — | 100 | 100 | 100 | — |
|  | PETA | Part | — | — | — | — | — | — | — |
|  | UV3000B | Part | — | — | — | — | — | — | — |
|  | A200 | Part | 10 | 10 | 10 | 10 | 10 | 10 | 10 |
|  | Irg184 | Part | 8 | 8 | 8 | 8 | 8 | 8 | 8 |
| Evaluation | Adhesiveness |  | A | A | B | A | A | A | A |
|  | Holding force |  | A | A | A | A | B | A | C |

Abbreviations in the tables have the following meaning.
MMA: Methyl methacrylate.
IBXMA: Isobornyl methacrylate.
Aam: Acrylamide.
2-EHA: 2-Ethyl hexyl acrylate.
LA: Lauryl acrylate.
n-BA: n-butyl acrylate.
AA: Acrylic acid.
MOI: "Karenz (registered trademark) MOI" (manufactured by Showa Denko K.K., product name, 2-methacryloyloxy ethyl isocyanate).
AOI: "Karenz AOI" (manufactured by Showa Denko K.K., product name, 2-acryloyloxy ethyl isocyanate).
4-HBA: 4-hydroxy butyl acrylate.
2-HEMA: 2-hydroxy ethyl methacrylate.
2-HEA: 2-Hydroxy ethyl acrylate.
MEK: Methyl ethyl ketone.
IDAA: Isodecyl acrylate.
PETA: NK ester TMM-3L manufactured by Shin-Nakamura Chemical Co., Ltd.
UV3000B: Urethane acrylate (manufactured by Mitsubishi Chemical Corporation, product name).
Irg184: IRGACURE184 (manufactured by BASF Corporation, product name).

A200: A-200 (manufactured by Shin-Nakamura Chemical Industries Inc., product name, polyethylene glycol diacrylate).

As in Table 2, the adhesive layers of Examples A1 to A11 were excellent in adhesiveness, holding force, wet heat clouding resistance, and low corrosiveness. As Table 3, the crosslinked adhesive layers of Examples A12 to A17 were also excellent in adhesiveness, holding force, wet heat clouding resistance, and low corrosiveness. The adhesive layer of Comparative Example A1 using a copolymer having a constituent unit having a carboxylic group and not having a constituent unit having an amide bond exhibited corrosiveness.

The adhesive layer of Comparative Example A2 using a copolymer having none of a constituent unit having a carboxylic group and a constituent unit having an amide bond was poor in wet heat clouding resistance while exhibiting low corrosiveness.

The adhesive layer of Comparative Example A3 was poor in holding force and wet heat clouding resistance.

The adhesive layers of Examples B1 to B16 were excellent in adhesiveness and holding force.

The adhesive layers of Comparative Examples B1 and B2 using a copolymer not having a radical polymerizable group were poor in holding force.

INDUSTRIAL APPLICABILITY

According to the present invention, it is possible to provide an adhesive resin composition capable of forming an adhesive layer excellent in holding force, wet heat clouding resistance, and low corrosiveness; a (meth)acrylic copolymer; and an adhesive sheet.

The invention claimed is:

1. An adhesive resin composition, comprising:
a (meth)acrylic copolymer (A) having a constituent unit derived from a macromonomer (a) having two or more constituent units of formula (a') and a constituent unit derived from a vinyl monomer (b),
wherein the (meth)acrylic copolymer (A) comprises an amide bond and/or a radical polymerizable group,

wherein
$R^1$ is H, a methyl group, or $CH_2OH$,
$R^2$ is $OR^3$, a halogen atom, $COR^4$, $COOR^5$, $CN$, $CONR^6R^7$, $NHCOR^8$, or $R^9$, $R^3$ to $R^8$ independently being H, an optionally substituted alkyl group, an optionally substituted alicyclic group, an optionally substituted aryl group, an optionally substituted heteroaryl group, an optionally substituted non-aromatic heterocyclic group, an optionally substituted aralkyl group, an optionally substituted alkaryl group, an optionally substituted organosilyl group, or an optionally substituted (poly)organosiloxane group, substituents being at least one selected from the group consisting of alkyl, aryl, heteroaryl, non-aromatic heterocyclic, aralkyl, alkaryl, carboxylic acid, carboxylic acid ester, epoxy, a hydroxy, alkoxy, primary amino, secondary amino, tertiary amino, isocyanate, sulfonic acid, and halogen,
$R^9$ is an optionally substituted aryl group, an optionally substituted heteroaryl group, or an optionally substituted non-aromatic heterocyclic group, substituents being at least one selected from the group consisting of alkyl, aryl, heteroaryl, non-aromatic heterocyclic, aralkyl, alkaryl, carboxylic acid, carboxylic acid ester, epoxy, hydroxy, alkoxy, primary amino, secondary amino, tertiary amino, a isocyanate, sulfonic acid, optionally substituted olefin, and halogen,
wherein the adhesive resin composition is active energy ray curable or her o-curable, and
wherein a number average molecular weight of the macromonomer (a) is in a range of from 1,000 to 6,000.

2. The composition of claim 1, wherein the macromonomer (a) is of formula (1)

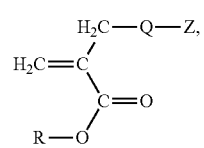

wherein
R is H, an optionally substituted alkyl group, an optionally substituted alicyclic group, an optionally substituted aryl group, an optionally substituted heteroaryl group, an optionally substituted non-aromatic heterocyclic group, an optionally substituted aralkyl group, an optionally substituted alkaryl group, an optionally substituted organosilyl group, or an optionally substituted (poly)organosiloxane group,
Q is a main chain portion comprising two or more constituent units of the formula (a'), and
Z is a terminal group.

3. The composition of claim 1, wherein the (meth)acrylic copolymer (A) comprises the amide bond.

4. The composition of claim 1, wherein the (meth)acrylic copolymer (A) comprises the radical polymerizable group.

5. The composition of claim 1, wherein the radical polymerizable group comprises an ethylenic unsaturated bond, and an ethylenic unsaturated bond equivalent is 3,000 to 150,000 g/mol.

6. The composition of claim 1, wherein a content of the constituent unit derived from the macromonomer (a) is 3% by mass to 60% by mass with respect to a total mass of all constituent units.

7. The composition of claim 1, wherein an acid value of the copolymer (A) is equal to or less than 3.9 mgKOH/g.

8. The composition of claim 1, wherein a difference between Tg of the macronomer (a) and Tg of a polymer obtained by polymerizing the vinyl monomer (b) is equal to or more than 50° C.

9. The composition of claim 1, wherein the vinyl monomer (b) comprises an alkyl (meth)acrylate (y1) in which the number of carbon atoms of is equal to or more than 4.

10. The composition of claim 1, wherein a weight average molecular weight of the (meth)acrylic copolymer (A) is in a range of from 1,000 to 1,000,000.

11. The composition of claim 1, wherein a content of a constituent unit comprising the amide bond in the constituent unit derived from the vinyl monomer (b) is in a range of from 0.1 to 30% by mass with respect to a total mass of the constituent unit derived from the vinyl monomer (b).

12. An adhesive sheet, comprising the adhesive resin composition of claim 1.

13. The composition of claim 1, wherein the number average molecular weight of the macromonomer (a) is in a range of from 3,000 to 6,000.

14. The composition of claim 1, further comprising:
a reaction initiator.

15. The composition of claim 14, wherein the reaction initiator is a photopolymerization initiator.

16. The composition of claim 14, wherein the reaction initiator is a heat polymerization initiator.

17. The composition of claim 1, wherein, in the constituent units of formula (a'), $R^9$ is an optionally substituted heteroaryl group, or an optionally substituted non-aromatic heterocyclic group, substituents being at least one selected from the group consisting of alkyl, aryl, heteroaryl, non-aromatic heterocyclic, aralkyl, alkaryl, carboxylic acid, carboxylic acid ester, epoxy, hydroxy, alkoxy, primary amino, secondary amino, tertiary amino, a isocyanate, sulfonic acid, optionally substituted olefin, and halogen.

18. The composition of claim 1, wherein the macromonomer (a) comprises a constituent unit derived from a (meth)acrylic monomer in at least 50% by mass, relative to a total mass of all constituent units of the macromonomer (a).

19. The composition of claim 17, wherein the macromonomer (a) comprises a constituent unit derived from a (meth)acrylic monomer in at least 50% by mass, relative to a total mass of all constituent units of the macromonomer (a).

20. The composition of claim 9, wherein the monomer (y1), which comprises no amide bond, is present in at least 30% by mass, with respect to a total vinyl monomer (b) mass.

* * * * *